US008734232B2

(12) United States Patent
Bunch et al.

(10) Patent No.: US 8,734,232 B2
(45) Date of Patent: May 27, 2014

(54) SYSTEM AND METHOD FOR GAMES HAVING A SKILL-BASED COMPONENT

(75) Inventors: David Bunch, Pleasanton, CA (US); Bryan M. Kelly, Alamo, CA (US); Sean C. Martin, Reno, NV (US); Roderick Ang, Las Vegas, NV (US); Martin S. Lyons, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 104 days.

(21) Appl. No.: 13/252,128

(22) Filed: Oct. 3, 2011

(65) Prior Publication Data

US 2012/0122553 A1 May 17, 2012

Related U.S. Application Data

(63) Continuation-in-part of application No. 12/946,723, filed on Nov. 15, 2010, now Pat. No. 8,550,903.

(60) Provisional application No. 61/413,096, filed on Nov. 12, 2010.

(51) Int. Cl.

| | |
|---|---|
| ***A63F 9/24*** | (2006.01) |
| ***A63F 13/00*** | (2014.01) |
| ***G07F 17/32*** | (2006.01) |

(52) U.S. Cl.

CPC ........ *G07F 17/3295* (2013.01); *G07F 17/3255* (2013.01); *G07F 17/3206* (2013.01); *G07F 17/32* (2013.01); *G07F 17/3276* (2013.01)

USPC .......... 463/25; 463/7; 463/9; 463/16; 463/30; 463/31

(58) Field of Classification Search

CPC . G07F 17/32; G07F 17/3206; G07F 17/3255; G07F 17/3276; G07F 17/3295

USPC ............................ 463/23, 7, 9, 16, 25, 30, 31

See application file for complete search history.

(56) References Cited

U.S. PATENT DOCUMENTS

| | | | | |
|---|---|---|---|---|
| 2008/0108425 | A1 * | 5/2008 | Oberberger | 463/25 |
| 2009/0062002 | A1 * | 3/2009 | Kotlarik et al. | 463/33 |
| 2009/0131158 | A1 * | 5/2009 | Brunet De Courssou et al. | 463/26 |
| 2011/0053676 | A1 * | 3/2011 | Wolf et al. | 463/20 |
| 2011/0077071 | A1 * | 3/2011 | Decasa et al. | 463/25 |
| 2011/0183749 | A1 * | 7/2011 | Allen et al. | 463/25 |
| 2011/0218035 | A1 * | 9/2011 | Thomas | 463/25 |
| 2012/0136465 | A1 * | 5/2012 | Guinn et al. | 700/92 |

* cited by examiner

*Primary Examiner* — Werner Garner

(74) *Attorney, Agent, or Firm* — Brooke Quist; Marvin Hein

(57) ABSTRACT

Disclosed are games, gaming machines, gaming systems and methods including a predetermined award presented in a manner in which a player's skill at the game appears to affect the amount of the award without actually having an effect on its amount.

12 Claims, 30 Drawing Sheets

FIG. 26
Your Bally You Drive Our Innovation
Your Mobile Offers
Blazing Sevens
Tournament
Leaderboard
$183.85 TravisBNYC
$136.54 FBueller
$121.76 IJONES81
$ 89.50 Mikeycorl
$ 44.12 HAL9000
Time Remaining - 08:14
SUBMIT ENTRY

SYSTEM AND METHOD FOR GAMES HAVING A SKILL-BASED COMPONENT

CROSS-REFERENCE TO RELATED APPLICATIONS

This application is a continuation-in-part of U.S. patent application Ser. No. 12/946,723, entitled "System and Method for Bonus Gaming using a Mobile Device," filed Nov. 15, 2010, which is incorporated herein by reference in its entirety. This application also claims the benefit of U.S. Provisional Application No. 61/413,096, filed Nov. 12, 2010, which is also incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This disclosure is directed to wagering games, gaming machines, networked gaming systems and methods and, more particularly, to wagering games, gaming machines, networked gaming systems and methods having a skill-based component.

BACKGROUND

Various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting. Feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays.

Some gaming machine games today include one or more progressive prize awards. In some configurations, the progressive prize may have a small probability of a player winning it; thus making it possible to have a larger progressive prize. In other game configurations, the progressive prize may be a small amount; thus allowing the player patron to win the progressive prize more frequently. In most typical game configurations, the player wins the progressive prize as a result of a specific game outcome within the primary or main game.

One way to make a feature game more attractive to players is to introduce an aspect of player skill to the game. Historically, skill-based gaming has been a niche product. One reason for this has been a lack of uniform regulation; each jurisdiction where gaming is allowed has quite different standards concerning skill-based gaming. In some jurisdictions it is banned altogether, while other jurisdictions only allow skill-based gaming for specific types of games, such as video poker.

Another problem with conventional skill-based gaming solutions is that it is much harder to produce a game that allows a minimally skilled player to achieve a reasonable payback (and thus encourage them to continue playing), while preventing an exceptionally skilled player from achieving a payback that exceeds 100% of coin-in. Operators are understandably wary about deploying games that have the potential to lose money, and even if a skill-based game is developed that cannot exceed 100% return-to-player (RTP), it must still be able to compete with other games on the casino floor in terms of overall profit for the operator.

While gaming machines including feature games have been very successful, there remains a need for games that provide a player with enhanced excitement and increased opportunity of winning. In particular, there remains a need for a game that enables a player to exercise their skill while the amount and frequency of prizes awarded through conventional means, such as a random number generator, are still completely controlled.

SUMMARY

Briefly, and in general terms, a method is disclosed of enabling game play of a pseudo skill-based game that includes a game of chance component and an apparent game of skill component. The method includes: providing a gaming machine having the pseudo skill-based game that awards game credits and game points; enabling game play on the gaming machine that presents the pseudo skill-based game, wherein the game credits are redeemable for a payout and are controlled by overall payout percentages relating to the game of chance, and wherein game points are not redeemable for a payout, game points are not controlled by overall payout percentages relating to the game of chance, and a number of game points awarded is increased according to player skill during game play of the pseudo skill-based game on the gaming machines; awarding a number of game credits per game that is not effected by player skill, and awarding a number of game points per game that is effected by player skill; and displaying one or more high scores in game points for the pseudo skill-based game over a period of time; wherein a user input device that is secondary to a primary game presentation is configured to receive directional, multi-touch gestures to facilitate skill-based user input. Preferably, a number of prizes awarded to the player is influenced by player skill, but a total prize amount awarded to the player is not influenced by player skill since prize value decreases corresponding with increases in prize frequency.

In still another embodiment, a method is disclosed of enabling game play of a pseudo skill-based game that includes a game of chance component and an apparent game of skill component. The method includes: providing a gaming machine having the pseudo skill-based game that awards game credits and game points; enabling game play on the gaming machine that presents the pseudo skill-based game, wherein the game credits are redeemable for a payout and are controlled by overall payout percentages relating to the game of chance, and wherein game points are not redeemable for a payout, game points are not controlled by overall payout percentages relating to the game of chance, and a number of game points awarded is increased according to player skill during game play of the pseudo skill-based game on the gaming machines; awarding a number game credits per game that is not effected by player skill, and awarding a number game points per game that is effected by player skill; displaying one or more high scores in game points for the pseudo skill-based game over a period of time, thereby using the high scores in game points from the pseudo skill-based game to facilitate competition among players to attain a highest score.

Finally, in some embodiments, a system is disclosed for enabling game play of a pseudo-skill based game that includes a game of chance component and an apparent game of skill component. The system includes a gaming machine having a primary game presentation that enables game play of a pseudo skill-based game that awards game credits and game points. The game credits are redeemable for a payout and are controlled by overall payout percentages relating to the game of chance. The game points are not redeemable for a payout, game points are not controlled by overall payout percentages relating to the game of chance, and a number of game points awarded is increased according to player skill during game play of the pseudo skill-based game on the gaming machines. The system also includes a user input device embedded in the gaming machine. The user input device is a secondary touch-screen to the primary game presentation and is configured to receive directional, multi-touch gestures to facilitate skill based user input. The number of prizes awarded to the player is influenced by player skill, but the total prize amount awarded to the player is not in not influenced by player skill since prize value decreases corresponding with increases in prize frequency. The number of game credits awarded per game is not effected by player skill, and the number of game points awarded per game is effected by player skill. Preferably, one or more high scores in game points are displayed for the pseudo skill-based game over a period of time.

Features and advantages will become apparent from the following detailed description, taken in conjunction with the accompanying drawings, which illustrate by way of example, the features of the various embodiments.

DETAILED DESCRIPTION OF PREFERRED EMBODIMENTS

Figure 1:
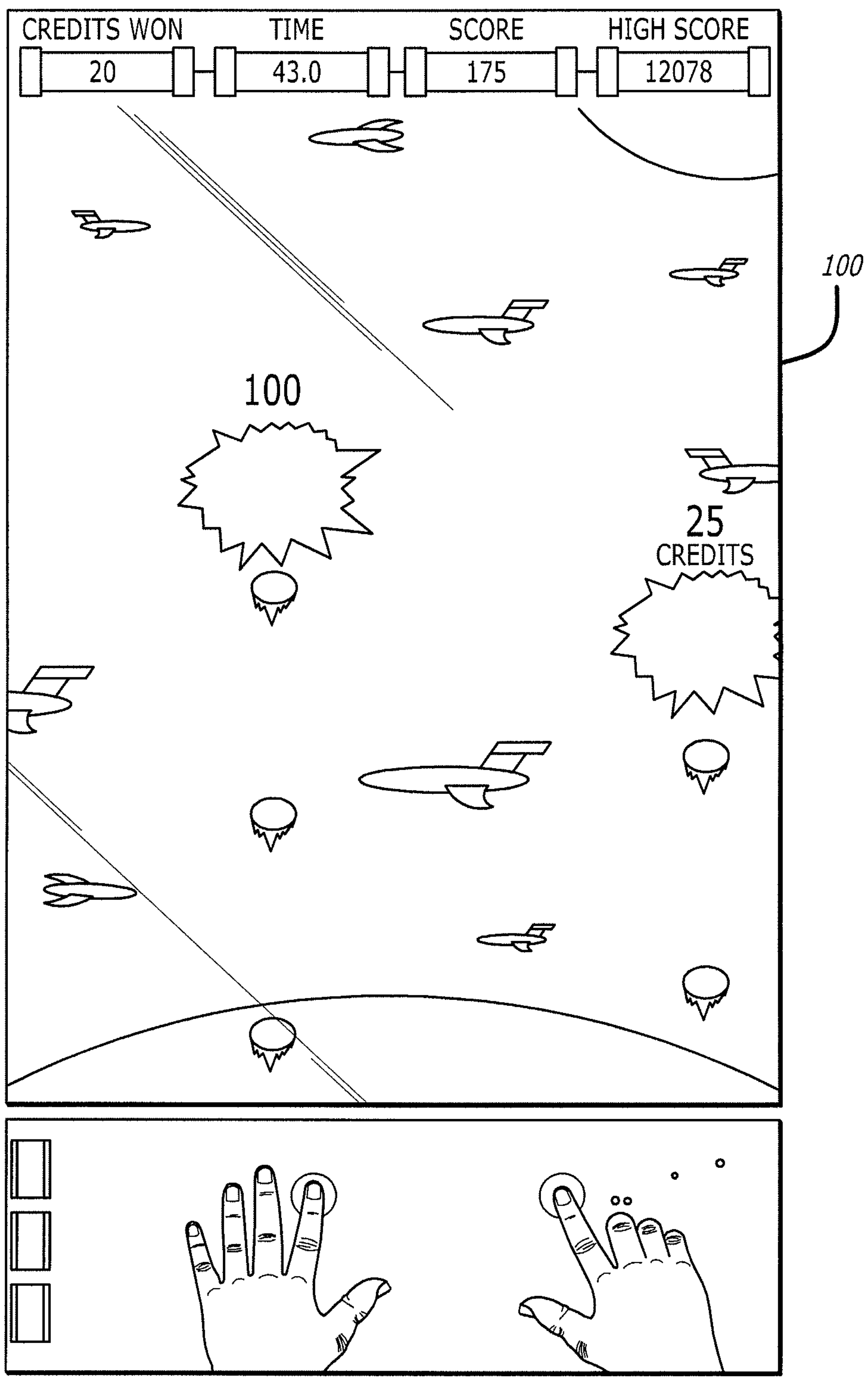
FIG. 1 illustrates a feature game in accordance with one or more embodiments.

Various embodiments are directed to a game, a gaming machine, gaming networks and a method for playing a game, wherein the game includes an aspect of skill. The embodiments are illustrated and described herein by way of example only, and not by way of limitation. Referring now to the drawings, and more particularly to FIGS. 1-28, there are shown illustrative examples of games, gaming machines, gaming networks and methods for playing a game in accordance with various aspects of the gaming system.

Figure 2:
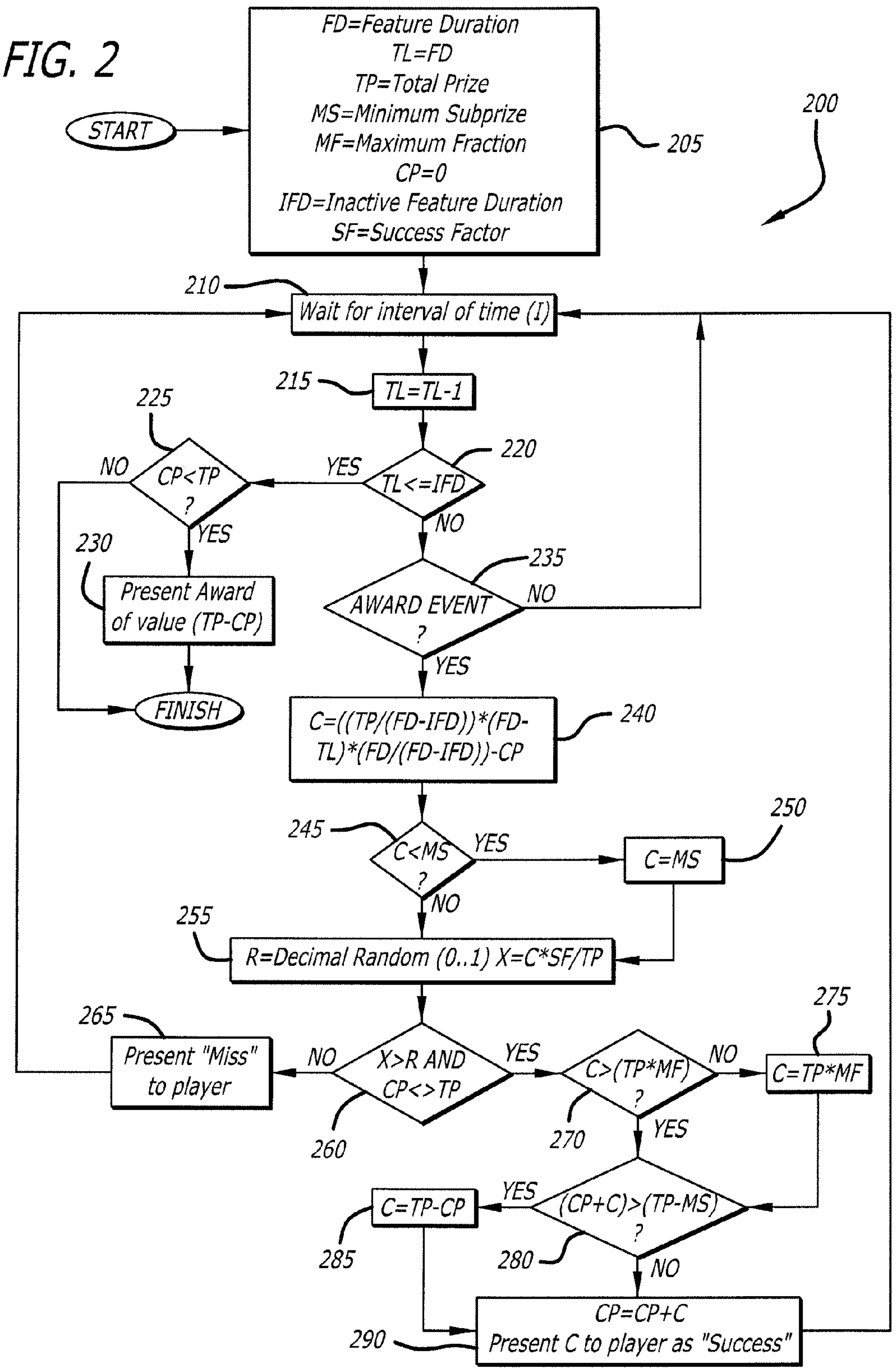
FIG. 2 is a functional block diagram depicting the steps associated with carrying out an example method in accordance with one or more embodiments.

An example in accordance with one or more aspects of a disclosed embodiment is shown in FIGS. 1-2. A preferred embodiment of a gaming system discloses a player participating in a skill-based feature game and having the opportunity to influence a number of prizes awarded. The number of prizes awarded is always more than zero (optimally, more than one) with the amount of each prize determined by game mathematics and random number generation algorithms. Thus, while the number of prizes awarded to the player is influenced by the player, the total prize amount awarded to the player is not in any way influenced by the skill of the player (e.g., while the number of prizes increasing, the value of the prizes decreases correspondingly). In this regard, a payout parameter for credit prizes may include an overall payout percentage that is the casino operator's desired percentage of the monetary income earned by the game apparatus that the operator wishes to provide back to players in the form of the prizes won using prize credits.

This payout percentage is not influenced by any player input or how the player has played the game of chance. Rather, this payout percentage governs the overall performance of the gaming machine for a game of chance so that the gaming machine falls within business and regulatory requirements. The payout percentage is a term of art that is defined as the long-term payout percentage of the game units based upon the amount of money wagered at those game units. For instance, a 98% payout gaming machine playing a game of chance, over the long-term, will pay out 98 cents of every dollar that is wagered at those particular gaming machines.

Referring now to FIG. 1, an embodiment of a pseudo-skill based game 100 (in which the total prize amount awarded to the player is not in any way influenced by the skill of the player) shows an "outer space" themed feature game being played. From the player's perspective, the game includes graphical images of space ships moving horizontally across a display. The player touches a secondary touchscreen (e.g., Bally's iDeck™) to launch "missiles" to try and destroy the space ships. Each time a spaceship is hit it is damaged, and after repeated hits it explodes. At this point the player is awarded either: (1) a credit/monetary amount, or (2) a number of points. In the embodiment shown in FIG. 2, the current totals are shown as (1) "Credits Won" and (2) "Score." In this embodiment, the feature game continues for a set period of time with the player accumulating both credit and score totals. Once the time expires, the player has no further control of missiles, but a "defensive shield" activates and destroys any spaceship remaining on screen, potentially increasing the credit total to the player.

After all ships are destroyed, the totals (i.e., credits won and score) are displayed to the player. The total credits won are awarded to the player, and the score is compared to a pre-existing high-score table. Depending upon the score total, the player's score may merit being included in the high-score table, and if so, the player is asked to submit their initials/name/handle to identify their score.

The above experience may lead the player to believe that their performance influenced the amount of credits won, but in fact this is not the case. While their score is derived by their play, the total credits won is fixed at the beginning of the feature game being played by a random number generator or other conventional prize awarding means, such as a marketing budget or mystery progressive award. One of many techniques for accomplishing this gaming experience is described below.

Referring now to FIG. 2, a logical flow diagram is shown that generally depicts the steps associated with a method 200 for carrying out a game in accordance with one aspect of the pseudo skill-based game 100. The order of actions depicted in FIG. 2 is for illustrative purposes only and should not be considered limiting. For example, the order of the actions may be changed, additional steps may be added, or some steps may be removed without deviating from the scope and spirit of the disclosed embodiments.

In one embodiment of the method illustrated in FIG. 2, a preset prize amount is awarded in smaller sub-amounts, spread throughout a time period during which a feature game is active. Typically, this embodiment does not award a set of sub-amounts that causes more than the preset prize to be awarded. In another aspect of this embodiment, the pseudo skill-based game 100 enables a player to interact with the feature game as aggressively or passively as they wish, awarding a large number of small prizes, or a small number of larger prizes accordingly. Furthermore, a player may change the aggressiveness of its behavior during the feature game and the system adjusts accordingly.

In one embodiment of the pseudo skill-based game 100, a number of variables are set at step 205. Feature duration (FD) is the length of time for the feature game to be played. A common value may be 30 or 60 seconds. The Time Left variable (TL) is set to equal this value initially. A variable (TP) is set to the total prize to be awarded, as chosen by the RNG or other prize awarding means. A minimum sub-prize (MS) is also set. This is the smallest amount that may be awarded for any given "hit" on a spaceship, or equivalent event. Typically, setting an MS value is a matter of choice for the game designer. It may be set to a fraction of TP (e.g., 0.1), a multiple of the player's wager, or as an absolute value. The only hard requirement is that MS<TP. A smaller MS value allows for more credit scoring "hits," but may lead to many prizes not being seen as being worthwhile by a very aggressive player. In one embodiment, an example value for MS may be three.

The variable MF is the maximum fraction variable. This is the maximum proportion of TP that may be awarded in one "hit." For example, if TP=1000, and MF=0.2, then the maximum sub-amount that may be awarded for a particular "hit" on a spaceship is 200. The choice of this value is controllable be the game designer. A higher MF may lead to more spaceships being hit without scoring, while a lower MF may ensure that more hits score credit awards, but with lower sub-amounts awarded each time.

Continuing with this embodiment, the next variable, CP, is initialized. The CP variable is the "cumulative prize," and is the total of sub-amounts already awarded during the feature game. This variable is set to zero at the beginning of the feature game. Another variable, IFD, is optionally set. The variable IFD represents the nominal time period at the end of a feature game when a player can no-longer participate, but scoring still occurs. In the space game example, this is the period during which the "defensive shields" obliterate all remaining spaceships still on screen. The reason for setting this variable to a meaningful value, such as 3.0 seconds, is so that a player may receive an award during the end of feature game that is consistent with their play throughout the active portion of the feature game.

Using a value of 3.0 for IFD and 30.0 for FD, one would expect to receive 10% of the overall prize during the "defensive shields phase" and 90% during the active phase. Setting the IFD variable to zero has the effect that all of the credits to be awarded may be awarded during the active phase (but not necessarily). The final variable initially set is the Success Factor (SF). The SF variable is used to calibrate the feature game by the game designer. In this regard, a lower value for the SF variable causes the player to receive zero credit amounts for "hits" more often, and thus higher credit amounts for the hits that do score. Adjusting the SF variable while keeping the MS variable low, and the MF variable high may be used to "balance" the feature game. An example value for the SF variable may be 8.0.

Once initialized, the feature game begins playing at step 210, and space ships start to appear on the display. Periodically, after some very small interval of time (I), which is usually at the rate of screen refresh (1/60th of a second), the main section of the process shown in FIG. 2 is followed.

In step 215, the variable "I" is subtracted from TL (the time left in the feature game). If, at step 220, TL is smaller or equal to IFD, then the interactive portion of the feature game has finished, and the inactive portion ("defensive shields active") commences at step 225. At this point, TP is compared to CP. To re-iterate, CP is the cumulative amount of sub-prizes awarded.

If, at step 225, CP<TP then a sub-prize of (TP−CP) is awarded to the player at step 230 during the course of all remaining ships on display being destroyed. This sub-prize of (TP−CP) may be split up using Gaussian distribution methods disclosed below. It should be noted here that if the player performs no action at all during the active portion of the feature game, CP will be zero, and thus the total prize (TP) would be awarded at this point. Notably, this inactive portion is meaningful because it ensures that exact TP credits are awarded in total to the player.

If, however, the time left (TL) in the feature game is larger than IFD at step 225, then the interactive portion of the feature game is presented starting at step 235. During this time, graphic images of space ships are being moved across the screen, and a player may interact by touching the iDeck™ to cause a "missile" to be fired upwards. The length of time of the touch determines the size, or intensity of the "missile," with long presses resulting in more powerful, and thus more destructive missiles. As a missile makes contact with a spaceship, a determination is made as to whether the contact has caused the spaceship to be destroyed. In the preferred embodiment, multiple smaller hits or one large hit (from a long press of the iDeck™ touchscreen) are required for a spaceship to be destroyed. If a spaceship is destroyed, then an Award Event occurs (see step 235).

If an award event occurs at step 235, then a calculation for a variable C is made at step 240. The variable C represents the optimum amount of credits to be awarded at the current time of the feature game. If a player has had multiple successful hits over a short period of time, C may be low. In contrast, if most of the interactive portion of the feature game has already passed without a successful hit, C may be quite high, maybe as much as TP*MF.

The variable C is calculated to be ((TP/(FD−ID))*(FD−TL)*(FD/(FD−IFD))−CP. Breaking down this equation, the constant (FD−IFD) represents the interactive portion of the feature game, so if the feature duration (FD) is 30 seconds, and the inactive feature duration is 5 seconds then (FD−IFD) would be 25.0. The variable TP/(FD−ID) is therefore the total amount to be awarded during the feature game divided by the active time. (FD−TL) is the time elapsed in the feature game, and (FD/(FD−IFD)) is a constant scaling factor to ensure that all of the total amount is available to be offered during the interactive portion of the feature game. The variable CP (the amount already awarded to the player) is subtracted, and from this an optimal amount for the variable C is derived.

Next, the variable C is tested against the minimum sub-prize (MS) at step 245. If it is smaller, the variable C is set to MS at step 250 in order to ensure that a prize smaller than MS is not awarded.

Continuing with the description of this embodiment, a random fractional number R is chosen in the range of 0.0 and 1.0 at step 255. The reason for introducing a random factor into the process is to give the player a more interesting and varied experience. The random factor makes the outcome less predictable for the player in terms of both size and frequency of cash awards.

For example, in this embodiment a temporary variable X is now computed to be C*SF/TP. The variable X is therefore the optimal amount to be awarded, C, multiplied by the success factor and divided by the total prize. X is then compared to R. The likelihood of X being bigger than R is directly proportional to C. The success factor (SF) is used as a tuning characteristic for the game designer, depending upon how objectively difficult it is for a player to trigger an award event during the feature game. If it is very difficult to "blow up" a spaceship, then SF may be set correspondingly high. In contrast, if a player can expect to have many award events then SF should be set low, to say 1.0. The SF variable may be set to different values for individual or groups of players. Additionally, players with a consistent record of high scores may have a lower SF value than a player who has never played the game before. Notably, modifying the SF variable does not change the total prize value to be awarded, it simply changes the number of sub-awards within the feature game.

At step 260, if X is smaller than R or CP=TP (which means that all credits to be awarded in the feature game have already been awarded), a "miss" is presented to the player at step 265. In one embodiment, this miss does not give the player a cash award, but it does add to a secondary "score" meter, which is discussed below.

If, at step 260, a "hit" has occurred, two more potential adjustments are made before the prize may be awarded. First, at step 270, the variable C is compared against TP*MF and if it is larger, set to be TP*MF at step 275. This ensures that the variable C is not larger than the maximum fraction of the total prize. Second, (CP+C) is compared against (TP−MS) at step 280. If (CP+C) is greater than (TP−MS), then C is set to be TP−CP at step 285. This represents the edge case where the amount of the total award still available to be awarded is less than the minimum allowed sub-prize if C was awarded. In this scenario, C is set to be all of the remaining credits to be awarded. This completes the feature game in terms of awarding of a prize, though a player may still obtain additional points for their "score total."

At step 290, the final task of the award event is to present the value C as a prize that the player has obtained. In one embodiment of this presentation, the value of C is superimposed over an exploding "spaceship" graphic image. At step 290, the variable C is also added to the variable CP so that the running total of prizes awarded is correct.

Figure 3:
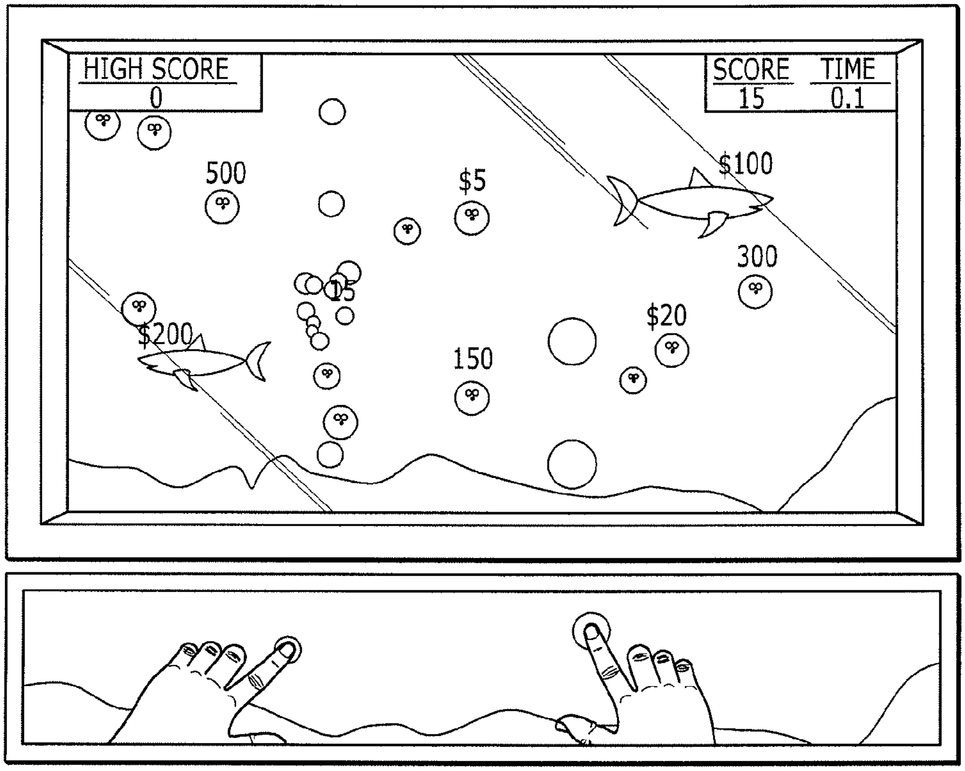
FIG. 3 is a functional block diagram depicting alternate steps associated with carrying out an example method in accordance with one or more embodiments.

FIG. 3 illustrates another embodiment of a game with an "aquatic" theme. In this game, a modification permits the feature game to offer a range of fixed prize amounts for successful "hits." In this example, hitting a "shark" with a bubble may give the player a chance to potentially earn $200, but hitting a "blowfish" may only have a prize value of $5 or $20 depending upon the blowfish's color. Again, it is notable that the overall prize award does not change. If a player is very successful at hitting a number of sharks, with an overall prize award that is low, the player will find that instead of being awarded cash awards, they will instead be awarded large numbers of points. In the example shown in FIG. 3, one shark 310 has a value of $200, and the other shark 320 has a value of $100. Typically, these values are only shown to the player upon a successful hit, and in the event of a cash award being given.

Figure 4:
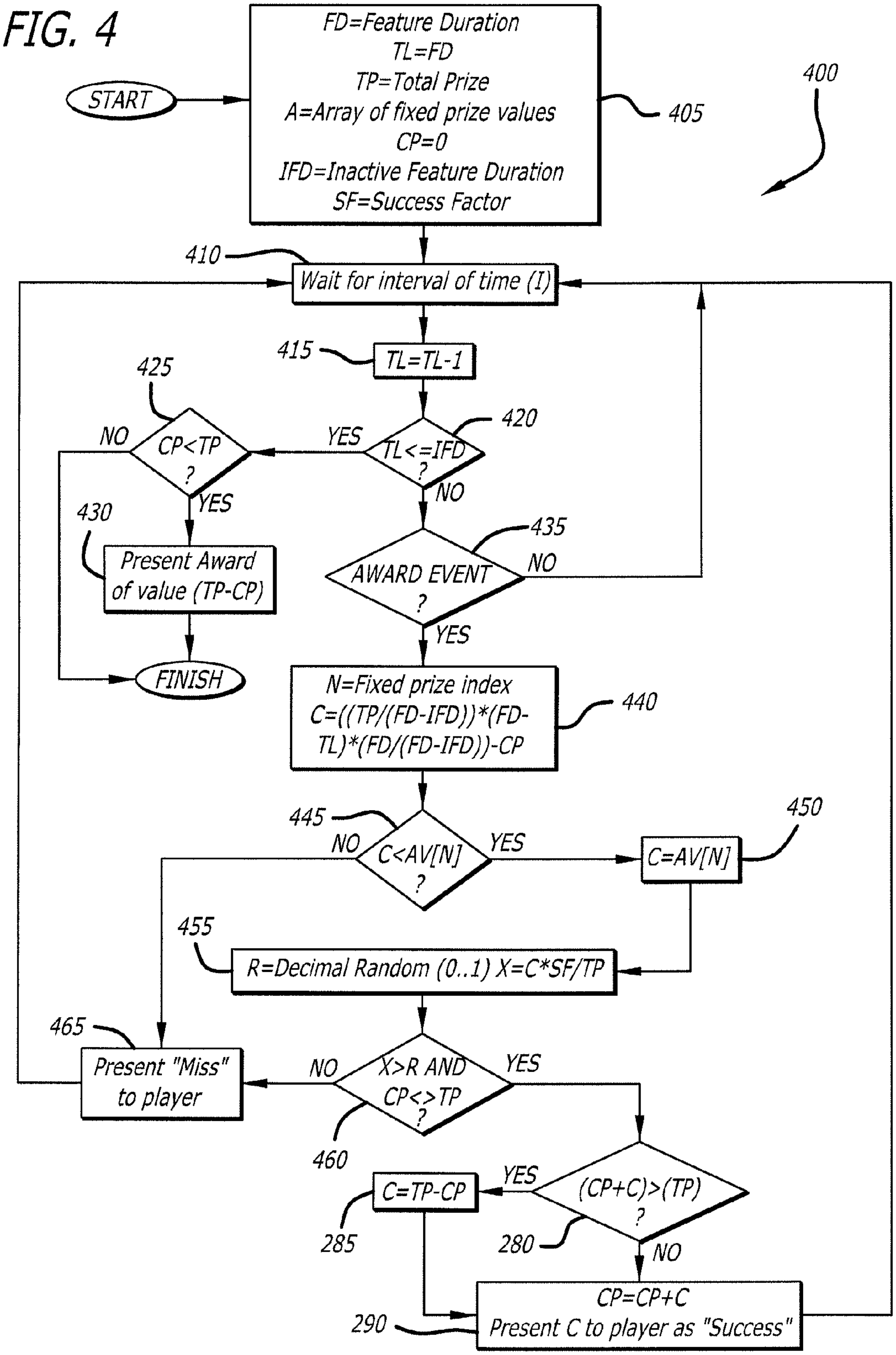
FIG. 4 illustrates another feature game in accordance with one or more embodiments.

Referring now to FIG. 4, a logical flow diagram is shown that generally depicts the steps associated with a method 400 for carrying out a game in accordance with the embodiment of FIG. 3. The order of actions as shown in FIG. 4 is for illustrative purposes only, and should not be considered limiting in any manner. For example, the order of the actions may be changed, additional steps may be added or some steps may be removed without deviating from the scope and spirit of the invention. To emphasize the differences between the two methods, descriptions of steps common to the methods of FIG. 2 and FIG. 4 (i.e., 415, 215; 410; 210, and the like) are not reiterated here.

At step 405, a number of variables common to the embodiment shown in FIG. 2 are set and will not be reiterated here. However, step 405 additionally includes: (i) removal of minimum and maximum sub-prize values (as they are not needed), and (ii) creation of an array of fixed prize values AV.

Referring to the embodiment shown in FIG. 3, there are multiple entries in the AV array for "sharks" 310 and 320 (e.g., $100 and $200), respectively. The selection of which entry to use may be randomly set when the graphic image of the shark appears on screen (but not shown to the player unless they have an awarding hit event). Alternatively, at the stage where the variable C is compared to AV[N], the variable C may be compared against multiple entries of the AV array so that an award of either $100 or $200 may be possible.

Presenting a "miss" to a player if the optimal prize to be awarded, "C," is smaller than the fixed prize desired (AV[N], where N is an index into an array of fixed prize values), differs from the method of FIG. 2. At step 445, C is tested against AV[N]. If C is larger or equal to AV[N] then C is set to be AV[N] at step 450 so that the exact prize desired is awarded. If C is less than AV[N], a miss has occurred. It is presented to the player at step 465.

If, at step 460, a "hit" has occurred, unlike the method of FIG. 2, only one potential adjustment is made before the prize may be awarded. (CP+C) is compared against TP at step 480. If (CP+C) is greater than TP, C is set to be TP−CP at step 485. All other steps are common between the two methods.

A further alternative embodiment is also possible using the method of FIG. 4. By testing multiple entries of the AV array, a fixed pay table of awards may be used. In such an embodiment, a gold coin may have a value of $200, a diamond may have a value of $40, and a pearl may have a value of $5. Shooting the "blowfish" may cause it to "spit out" a diamond, pearl or gold coin graphic that the player collects in a collection area at the bottom of the display. The choice of which graphic is "spat out" is therefore set by the method shown in FIG. 4, dependent on the total award, the amount already awarded, and the time left in the feature game.

In another aspect, the presentation of the award of any remaining credits, (TP−CP), can be achieved by ensuring that the pay table includes elements that cover both very small (one unit) up to larger prizes. This ensures that the final award may always be made up to the correct TP amount.

Figure 5:
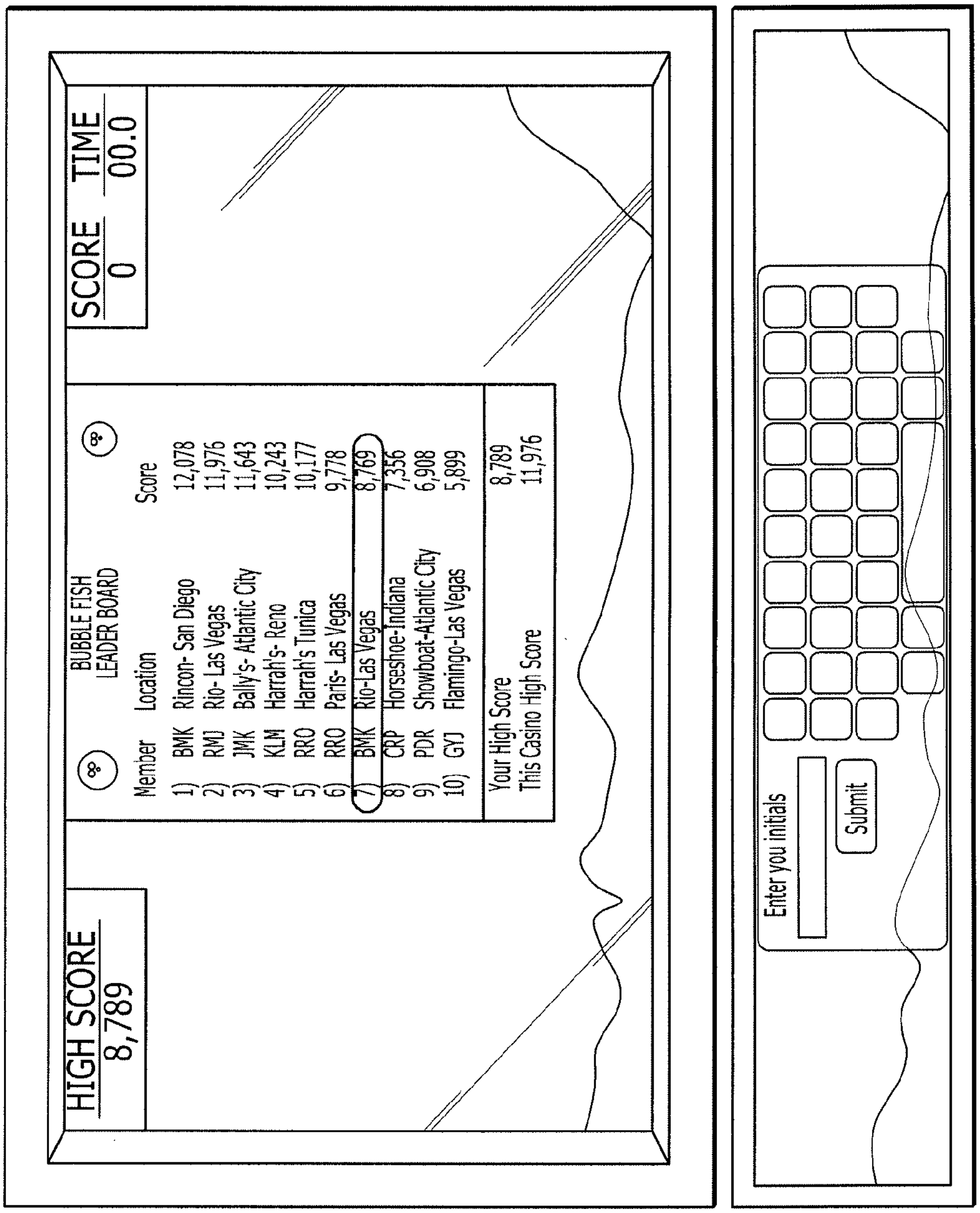
FIG. 5 illustrates a leader board in accordance with one or more embodiments.

FIG. 5 shows another embodiment of the pseudo-skill based game 100. As stated above, to add to the entertainment value of the feature game, a player may be awarded non-cash points for scoring events that cannot, or do not, pay an award. These points accumulate during a feature game, and thus represent the true skill of the player. While no cash award is given for a high points score, the player is encouraged to enter their initials or name for particularly high scores so that they may compete against other players either at the same property or elsewhere. In some jurisdictions where true skill gaming is allowed, it is possible that the players who achieve the highest scores over a period of time may be given feature prizes or entry into tournaments.

Figure 6:
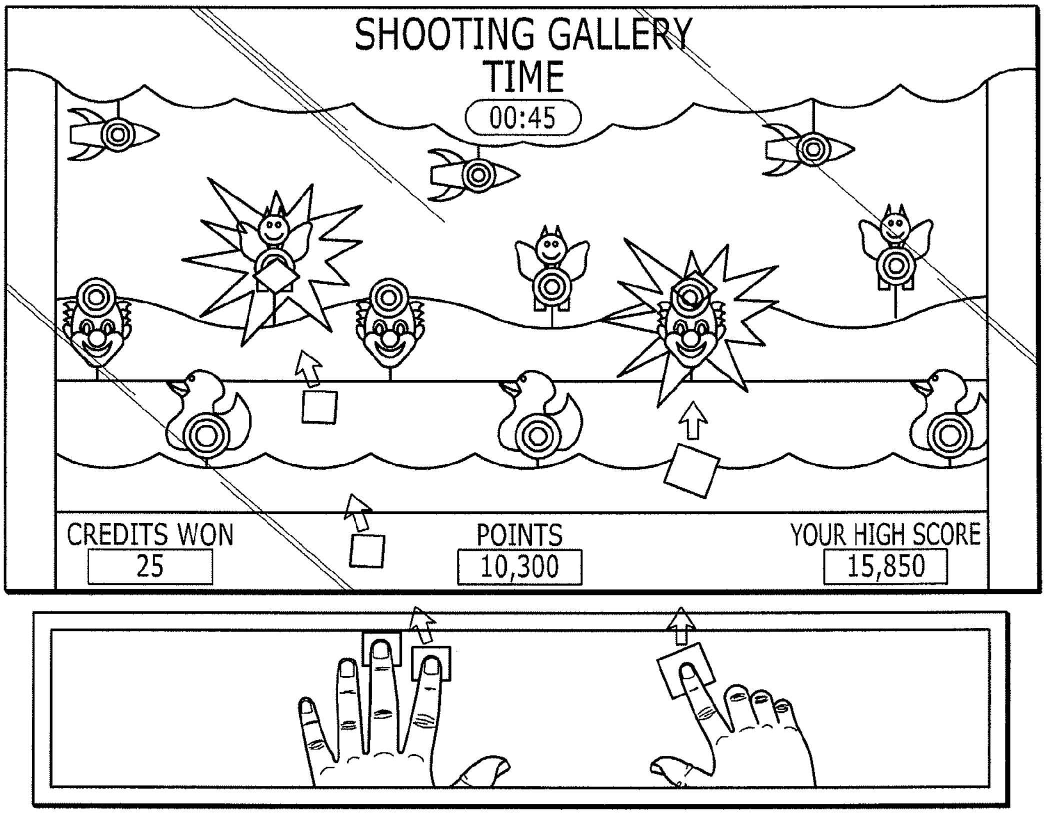
FIG. 6 illustrates use of directional, multi-touch gestures in a feature game in accordance with one or more embodiments.

FIG. 6 shows an additional feature of the pseudo skill-based game 100. In this example, a "shooting gallery" is offered to the player using either variable or fixed prize values as described above. In both of the other embodiments previously described ("space" and "fishing") a player interacts by touching the iDeck™ touchscreen, causing a missile or bubble to be sent vertically upwards from the point of touch. In contrast, in this embodiment, a player performs a "flick" gesture on the iDeck™ touchscreen. The vector derived from this gesture determines the velocity and direction of the "bean-bag" graphic that is first displayed on the iDeck™ screen, and then on the main display as it moves upwards.

In the embodiment of the pseudo skill-based game 100 shown in FIG. 6, a player has used the multi-touch technology of the iDeck™ to simultaneously launch "bean bags" from both his left hand and his right hand. In this embodiment, the left-handed "bean bags" are launched along a vector of roughly 20 degrees from the vertical, while the right-handed "bean bags" are launched roughly vertically.

Figure 7:
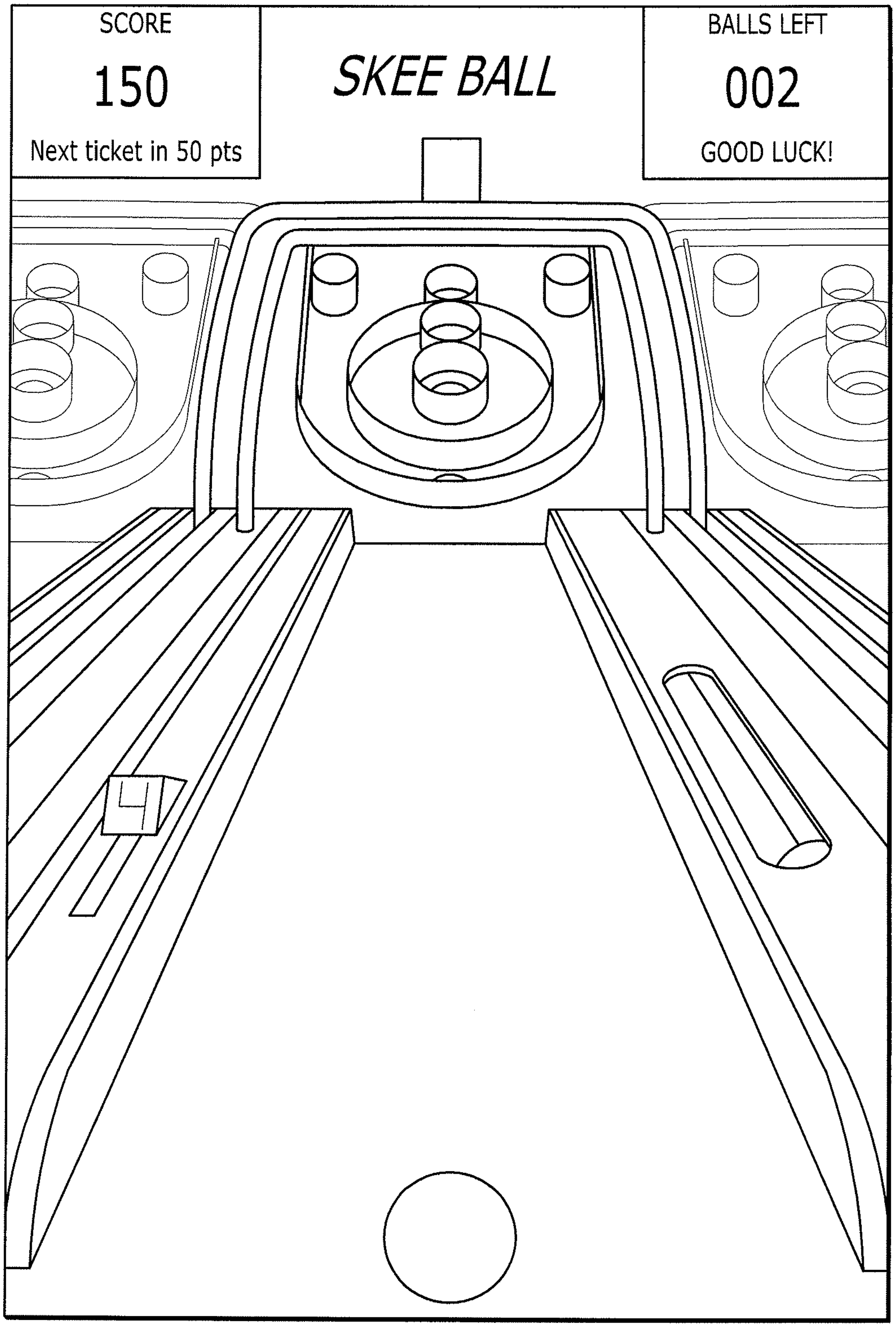
FIGS. 7-13 illustrate various aspects of a feature game in accordance with one or more embodiments.
Figure 8:
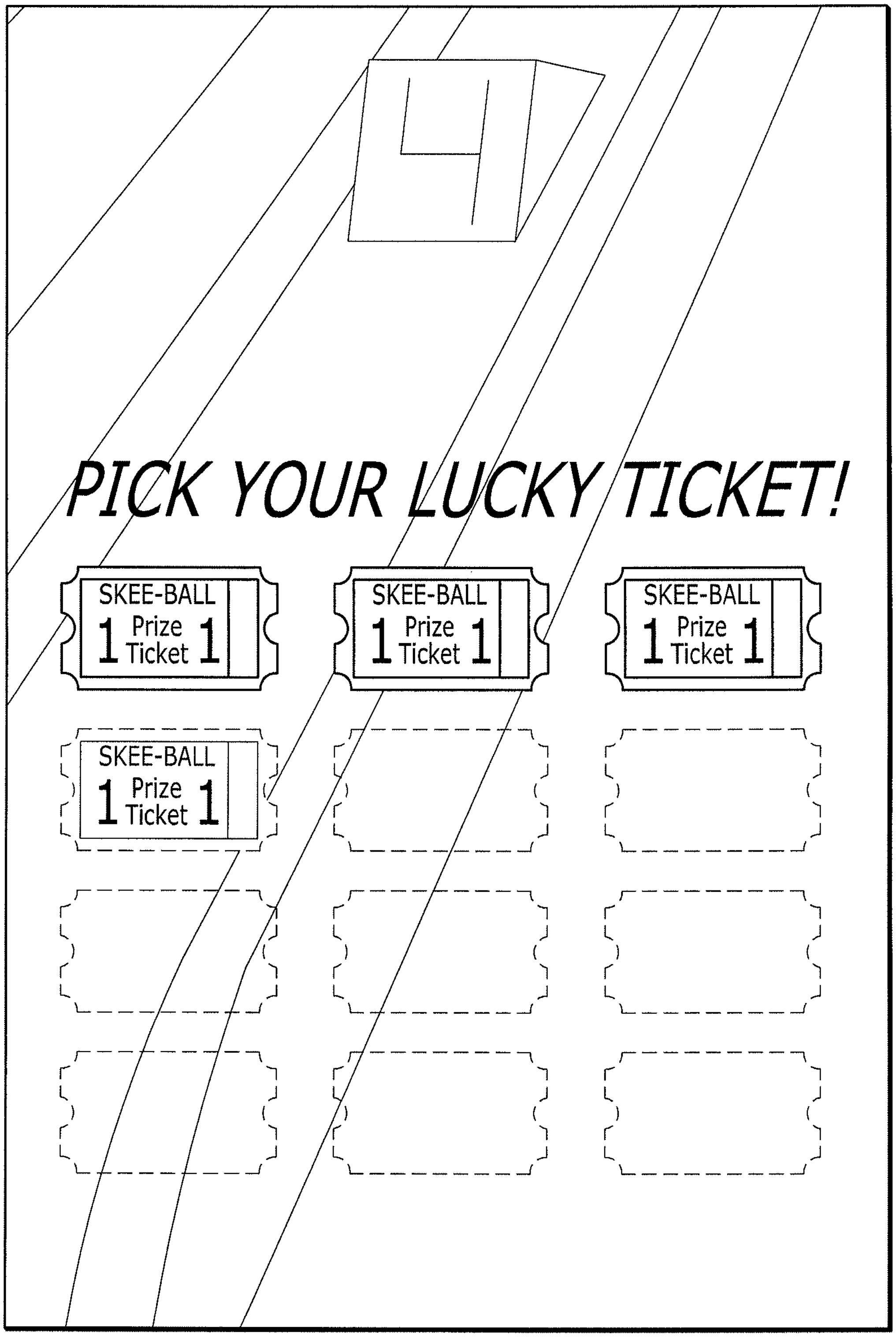

FIG. 7 shows another embodiment of the pseudo skill-based game 100. In this embodiment, a game of "skee ball" is offered to the player. In "skee ball" a player is given a number of balls to aim at a target composed of a number of chutes. Each chute has a value associated with it, and the most difficult chutes to target have the largest values. Conventionally, skee ball is a skill-based game. A player tries to aim the ball to land in the highest prize chutes. The more skilled the player, the more tickets they are awarded, as tickets are awarded at regular intervals of scoring. As has been noted above, if this were to be offered in a casino environment as-is, it would be classed as a skill-based game with all the associated regulations. An alternative to such a "skill-based" embodiment is to remove the player control of the ball, and instead have the launch trajectory of the ball be determined by a random number generator. While this alternative does remove the skill element, it also has the problem of removing most, if not all, of the entertainment value from the skee-ball feature game.

However, the following is another non-skill based embodiment of a skee-ball feature game. In this embodiment, a player is given a number of "balls" (the number may be a variable set by the game designer, the operator, or in accordance with player loyalty status). As shown below, the number of balls does not affect the total prize amount to be awarded. There is also a score with tickets that are awarded. The player is able to aim a ball by placing their finger on the touchscreen over the point at which they wish to launch the ball, then making a vertical gesture to launch the ball. This gesture generates a velocity and direction for the ball, which travels through the simulation of the skee-ball arena up to the target chutes.

To ensure this game works optimally, the lowest score required for a single ticket should be low enough that a player is guaranteed to achieve at least one, and the interpretation of the gesture should be such that a minimum velocity and variation from vertical direction is enforced. This ensures that the player always hits at least the target marked with "10." As an example, if a player is given 5 balls to aim and throw, and the lowest possible score from any particular attempt is 10 points, then awarding a ticket for 50 points total or less will ensure that the player always receives at least one ticket per game.

Assuming the player has 5 balls to aim and throw, and that he or she is guaranteed at least a score of 10, it can also be determined that a maximum score of 500 is achievable. If a ticket is awarded for every 50 points achieved, it may be determined that a player may receive between a total of 1 and 10 tickets for any given feature game.

Figure 9:
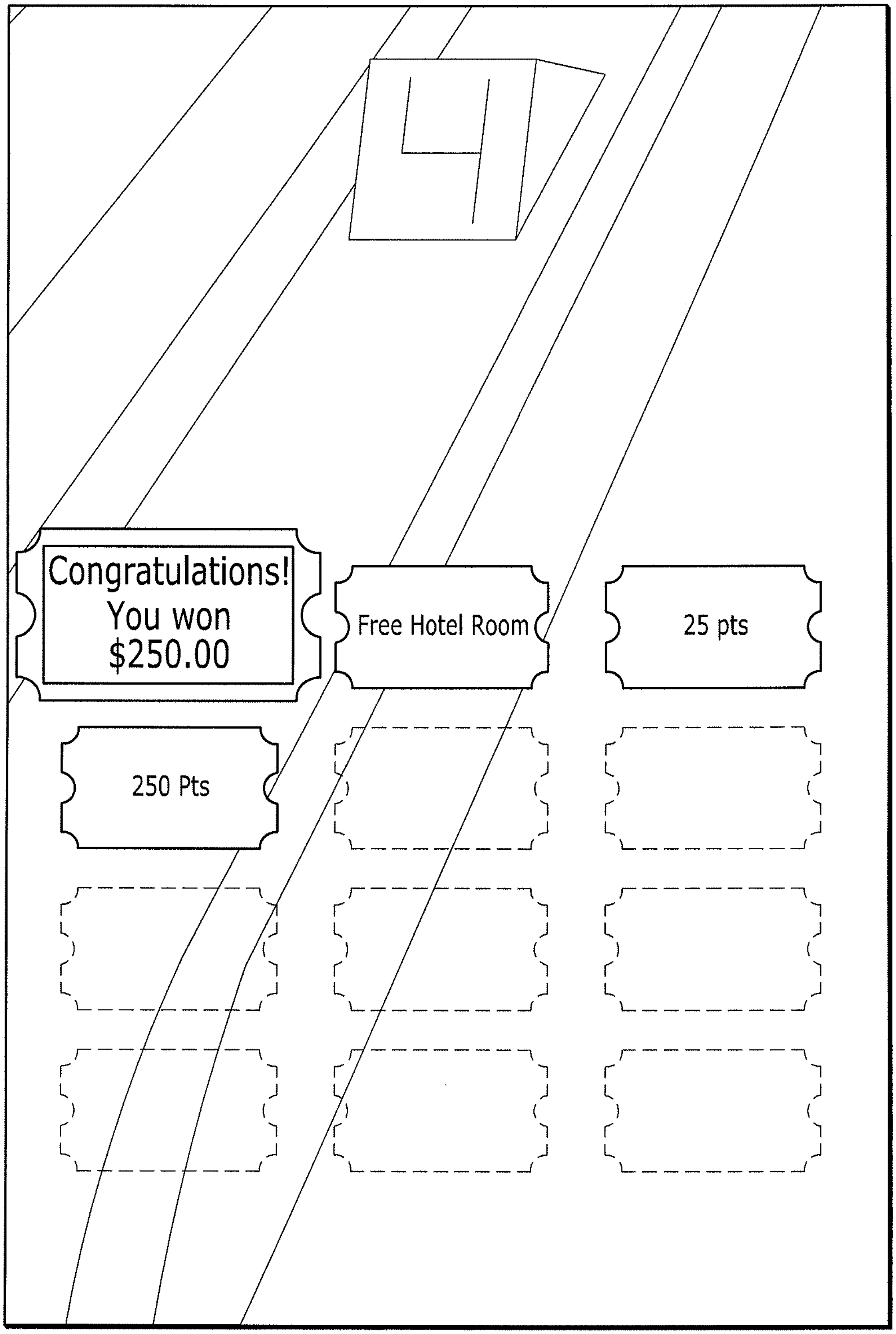

Notably, the number of tickets obtained by the player does not influence the prize to be awarded. In a first embodiment shown in FIGS. 8 and 9, a player has won 4 tickets, which has the result of giving the player the choice of four tickets to choose from to reveal the prize. If the player had only won one ticket, the player would have only one ticket to touch. Correspondingly, if the player had won 10 tickets, the player would have 10 tickets from which to choose. In FIG. 9, the player has touched one ticket and revealed a prize of $250.00. This award ends the feature game. Each of the prizes "hidden" behind the tickets is chosen independently by a pay table using a random number generator or other conventional means, and thus may be revealed at the end of the feature game (if desired by the game designer).

The benefit of this embodiment is that the greater level skill from the player does not result in a larger prize. Instead this embodiment results in the player receiving more opaque tickets to choose from, but only the same final prize. The additional tickets only lead to a wider selection of (non-winning) prizes to be revealed. Because each hidden prize is selected independently from the pay table, the odds of a prize appearing behind a particular ticket are consistent no matter how many tickets appear. This result, of course, is not necessarily known by the player. Additionally, when the skilled player receives a larger number of tickets, the player has tangible evidence of the highly skilled play, which may be used for "bragging rights" over the player's friends.

Figure 10:
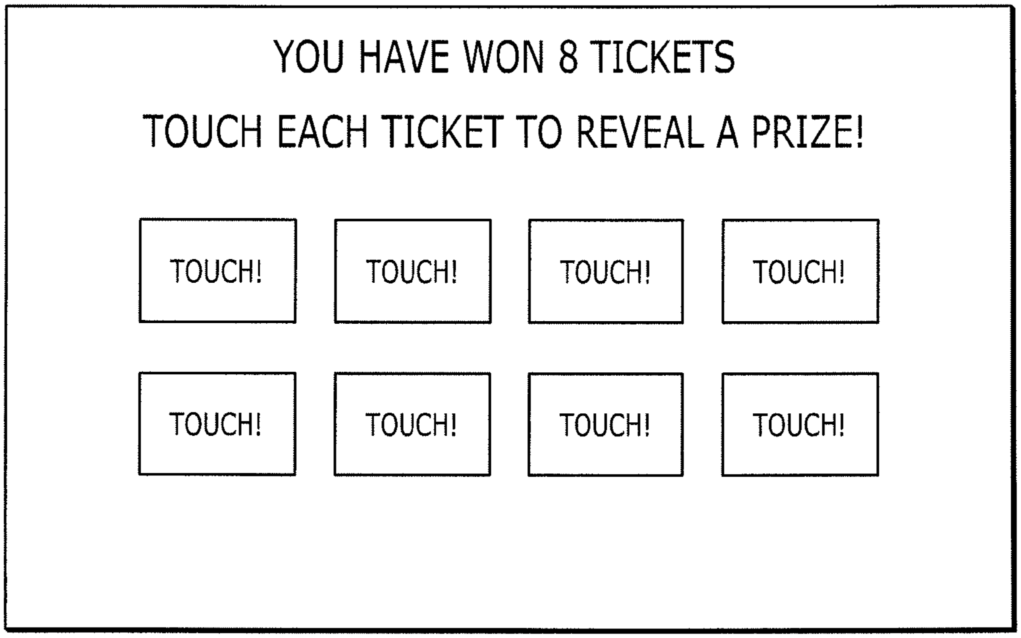
Figure 11:
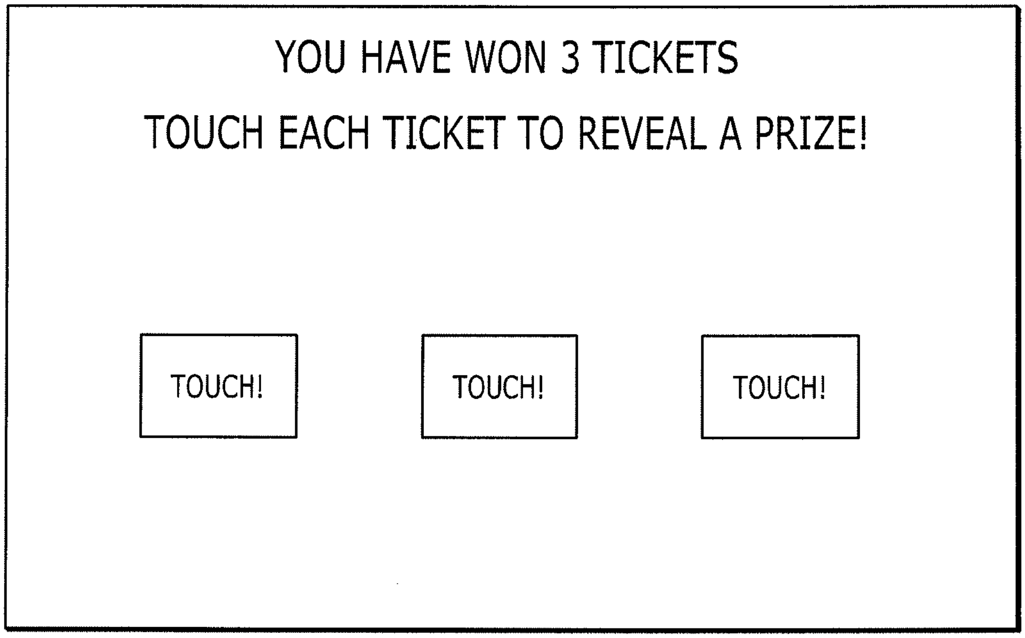

FIGS. 10 and 11 show an alternative embodiment for the outcome of a skee-ball game. In these examples, a first play of the feature game has won eight tickets and a second play has won three tickets, but both plays have an underlying award (not shown to the player) of 1000 credits.

Figure 12:
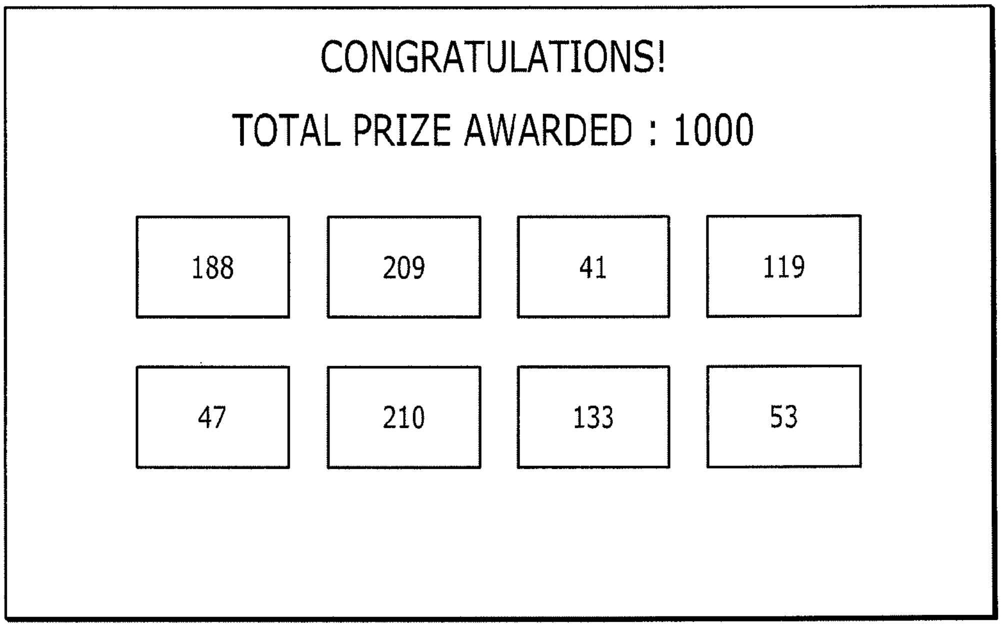
Figure 13:
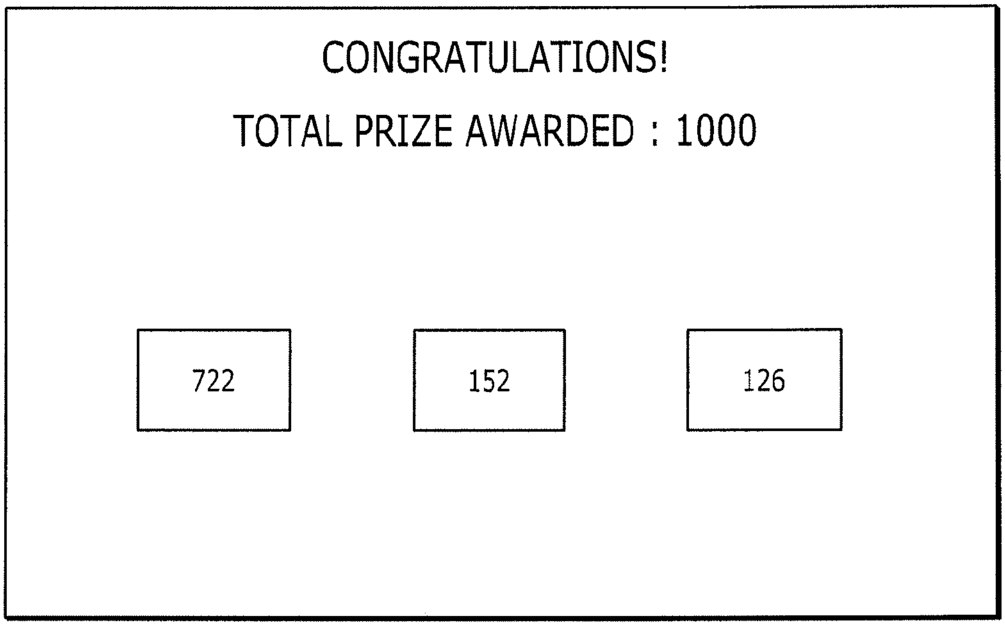

In this embodiment, the player is able to touch all of the tickets to reveal prizes, and the total they receive is the sum of all the prizes revealed. FIGS. 12 and 13 therefore show the corresponding outcomes for a total prize award of 1000 credits. The method for splitting the total prize into smaller portions may use a Gaussian random number distribution centered around the average prize to be given per ticket, as disclosed in provisional application "A System and Method for Providing a System Generated In-Game Bonus in a Gaming Environment," Patent App. No. 61/412,888, filed Nov. 12, 2010, which is incorporated herein by reference in its entirety. For a Gaussian distribution, if there are N tickets to be awarded for a prize of P, then N tickets are computed to be random numbers R[N] centered around (N/P), with an appropriate sigma factor of, for example, 2.0 standard deviations. Each ticket value is then normalized by multiplying each element of R by P/ΣR.

In other embodiments, additional creative methods may be used to split up the total prize using the methods disclosed in "System, Apparatus And Method For Saving Game State And For Utilizing Game States On Different Gaming Devices," patent application Ser. No. 12/792,466, filed Jun. 2, 2010, which is incorporated herein by reference in its entirety. In the above examples, a prize of 1000 credits may be split into either three or eight smaller prizes with expected values of 333 or 125, respectively. Each of these expected values are not be real values, but instead values to be fed into the feature retrieval process. So eight tickets with an expected value of 125 could lead to a player receiving 15 free games in one ticket (real value 300), five free games in another ticket (real value 100), a ticket with a value of 50, another ticket with a value of 200, and so on.

In accordance with one or more embodiments of the pseudo skill-based game 100, progressive prizes may be awarded as part of feature game play. The progressive prizes may be calculated by a progressive controller such as a controller manufactured by Mikohn, Inc. The progressive controller monitors wagering during base game play, calculates a current value for one or more progressive jackpot pools, and transmits the current pool values to the gaming machine. In one or more embodiments, progressive awards are accumulated during regular play as a percentage, such as three percent, of the game play take. The prizes may be sized according to the preferences of the casino operator. The number of prizes may vary without deviating from the scope of the disclosed embodiments. The size of the prizes is dependent on the amount of play, prior to initiating feature game play, and may come from the contributions of a single gaming machine or a number of linked gaming machines. In another aspect, the prizes may be set amounts established by the casino operator from non-coin-in funds, such as marketing funds.

In one or more embodiments, the prizes for feature game play may be accumulated based on funding mechanisms other than a percentage of wagers accumulated by the gaming machine. For example, an operator may initially fund various award pools with a pre-determined amount of money, such as $1000 for one progressive, $500 for a second progressive, $100 for a third progressive, and so on. Subsequently, the casino operator may determine to increase the amounts of one or more of the awards at pre-determined times, which may be periodically or randomly selected with a range of times or periods. Once a winner has occurred at any level, the award levels may be rolled back to the initial funding level. In one or more embodiments, only the winning award level is rolled back to the initial funding level.

In one or more embodiments, the prizes for feature game play may be set amounts, i.e., non-progressive. In one or more embodiments, the algorithms to determine the amounts may be determined by a statistical percentage based on an average take of a gaming machine and the likelihood of the win over a period of time. In the case where one or more gaming machines are networked, a common award table may be utilized where the award algorithms are determined based on an average take (total wagers) of all the networked gaming machines and the likelihood of a win of an award over a period of time. Each award may be calculated in a similar manner based on the likelihood of a winning outcome being achieved during a game play session.

Figure 14:
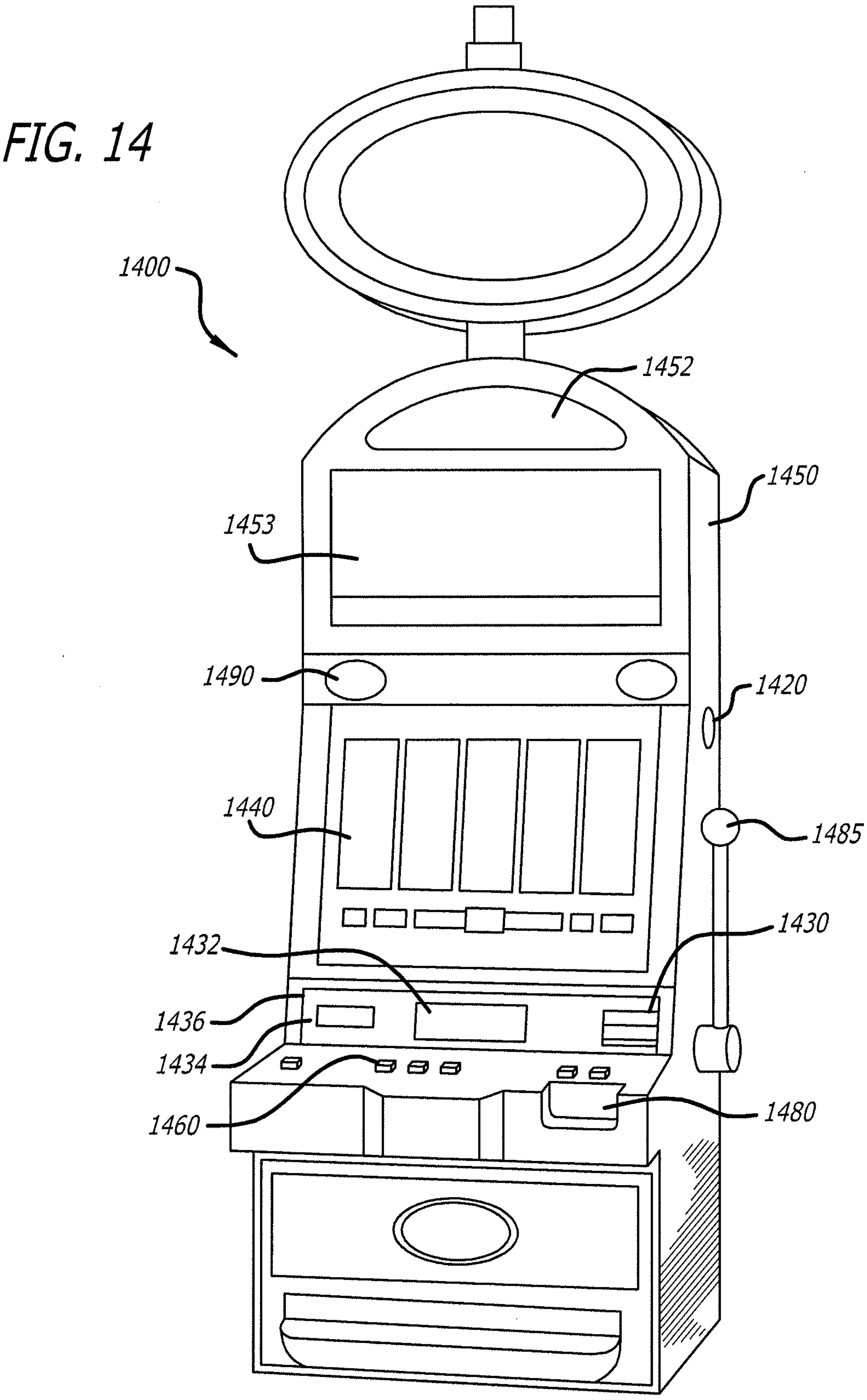
FIG. 14 is a perspective view of a gaming machine in accordance with one or more embodiments.

Referring to FIG. 14, the gaming machine 1400 is capable of supporting various embodiments of the pseudo skill-based game 100, including cabinet housing 1420, primary game display 1440 upon which a primary game and feature game may be displayed, top box 1450 which may display multiple progressives that may be won during play of the feature game, player-activated buttons 1460, player tracking panel 1436, bill/voucher acceptor 1480, and one or more speakers 1490. Cabinet housing 1420 may be a self-standing unit that is generally rectangular in shape and may be manufactured with reinforced steel or other rigid materials which are resistant to tampering and vandalism. Cabinet housing 1420 may alternatively be a handheld device including the gaming functionality as discussed herein and including various elements of the described components herein. For example, a handheld device may be a cell phone, personal data assistant, or laptop or tablet computer, each of which may include a display, a processor, and memory sufficient to support either standalone capability, such as gaming machine 400, or thin client capability, such as that incorporating some of the capability of a remote server.

In one or more embodiments, cabinet housing 1420 houses a processor, circuitry, and software (not shown) for receiving signals from the player-activated buttons 1460, operating the games, and transmitting signals to the respective displays and speakers. Any shaped cabinet may be implemented with any embodiment of gaming machine 1400 so long as it provides access to a player for playing a game. For example, cabinet 1420 may comprise a slant-top, bar-top, or table-top style cabinet, including a Bally Cinevision™ or CineReels™ cabinet. The operation of gaming machine 1400 is described more fully below.

The plurality of player-activated buttons 1460 may be used for various functions such as, but not limited to, selecting a wager denomination, selecting a game to be played, selecting a wager amount per game, initiating a game, or cashing out money from gaming machine 400. Buttons 460 may be operable as input mechanisms and may include mechanical buttons, electromechanical buttons or touch screen buttons. Optionally, a handle 1485 may be rotated by a player to initiate a game.

In one or more embodiments, buttons 1460 may be replaced with various other input mechanisms including, but not limited to, a touch screen system, touch pad, track ball, mouse, switches, toggle switches, or other input means used to accept player input such as a Bally iDeck™. One other example input means is a universal button module as disclosed in U.S. patent application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

In one embodiment, the cabinet housing 1420 may optionally include top box 1450 which contains "top glass" 1452 comprising advertising or payout information related to the game or games available on gaming machine 1400. Additionally, the player tracking panel 1436 may include a player tracking card reader 1434 and a player tracking display 1432. Continuing, a voucher printer 1430 may be integrated into player tracking panel 1436 or installed elsewhere in cabinet housing 1420 or top box 1450.

In another aspect of one embodiment, a game display 1440 may present a game of chance wherein a player receives one or more outcomes from a set of potential outcomes. For example, one such game of chance is a video slot machine game. In other aspects of the embodiment, the gaming machine 1400 may present a video or mechanical reel slot machine, a video keno game, a lottery game, a bingo game, a Class II bingo game, a roulette game, a craps game, a blackjack game, a mechanical or video representation of a wheel game, or the like.

Mechanical or video/mechanical embodiments may include game displays such as mechanical reels, wheels, or dice as required to present the game to the player. In video/mechanical or pure video embodiments, game display 1440 is typically a CRT or a flat-panel display in the form of, but not limited to liquid crystal, plasma, electroluminescent, vacuum fluorescent, field emission, or any other type of panel display known or developed in the art. Game display 1440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference.

Game display 1440 may also present information such as, but not limited to, player information, advertisements and casino promotions, graphic displays, news and sports updates, or even offer an alternate game. This information may be generated through a host computer networked with gaming machine 1400 on its own initiative, or it may be obtained by request of the player using either one or more of the plurality of player-activated buttons 1460; the game display itself, if game display 1440 comprises a touch screen or similar technology; buttons (not shown) mounted about game display 1440 which may permit selections such as those found on an ATM machine, where legends on the screen are associated with respective selecting buttons; or any player input device that offers the required functionality.

Cabinet housing 1420 incorporates a single game display 1440. However, in alternate embodiments, cabinet housing 1420 or top box 1450 may house one or more additional displays 1453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 15A:
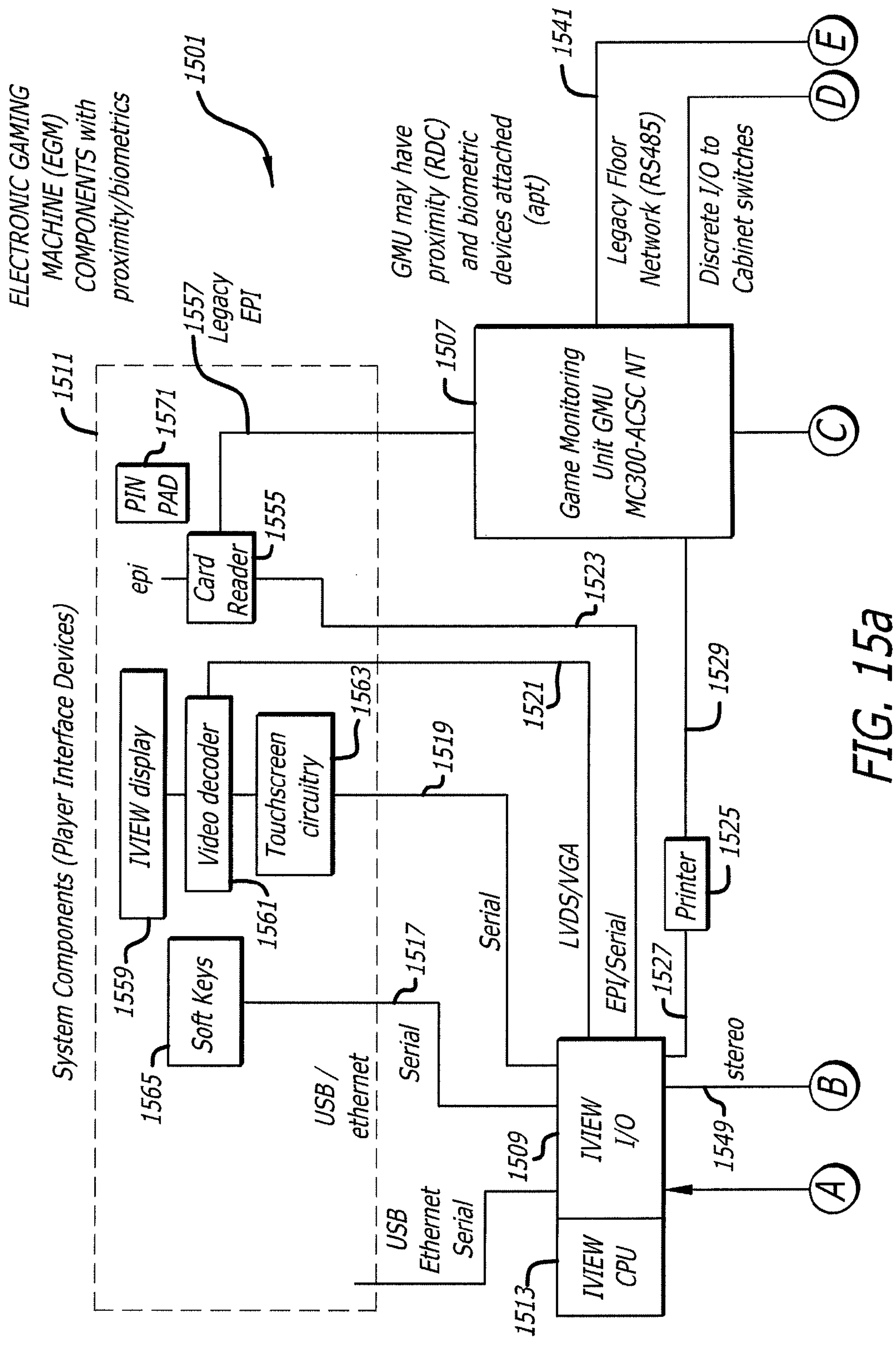
FIG. 15 is a block diagram of the physical and logical components of the gaming machine of FIG. 14 in accordance with one or more embodiments.
Figure 15B:
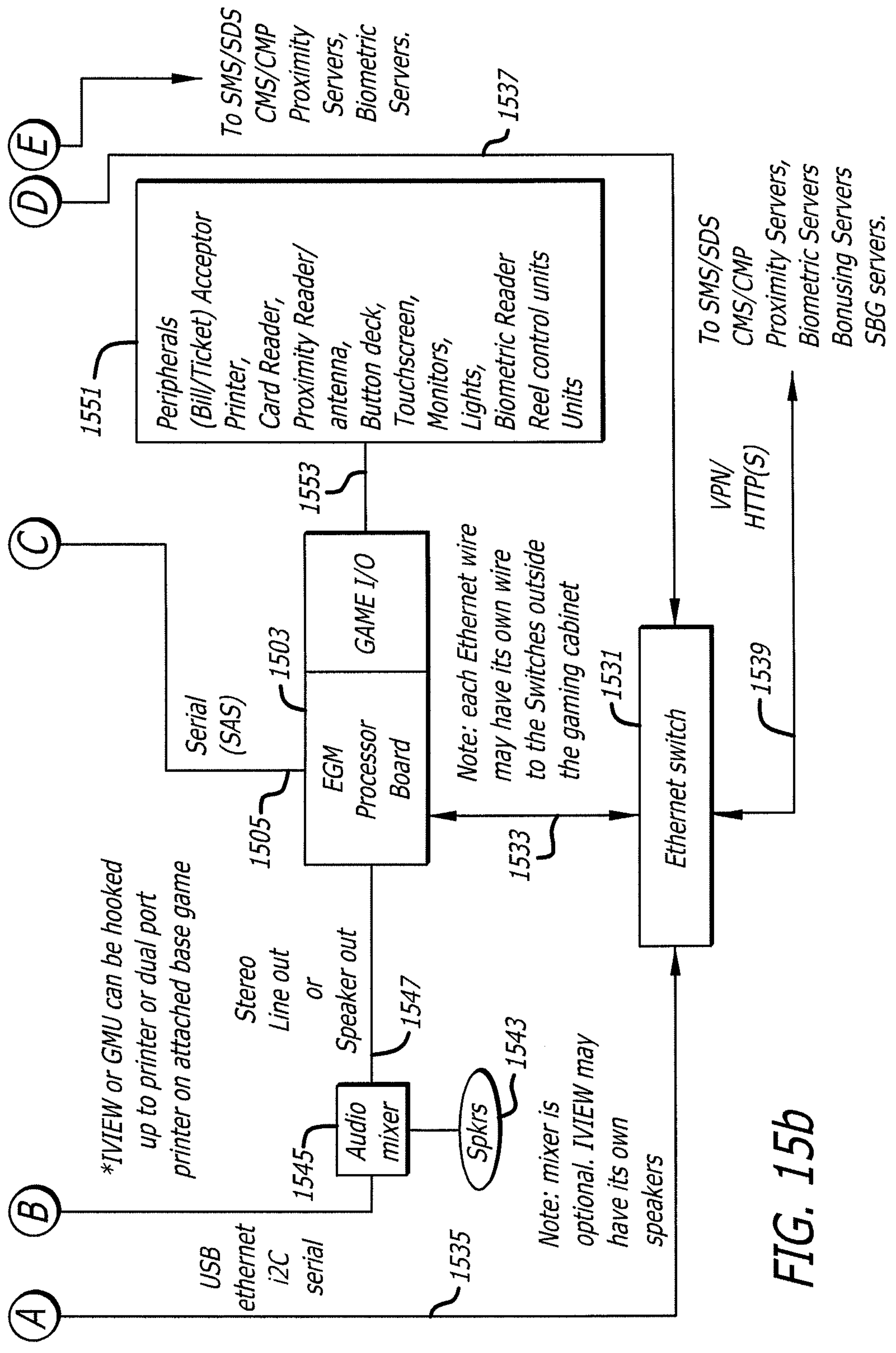

Referring to FIG. 15, electronic gaming machine (EGM) 1501 is shown in accordance with one or more embodiments. EGM 1501 includes a base game integrated circuit board 1503 (EGM Processor Board) connected through a serial bus line 1505 to game monitoring unit (GMU) 1507 (such as a Bally MC300 or ACSC NT), and a player interface integrated circuit board (PIB) 1509 connected to player interface devices 1511 over bus lines 1513, 1515, 1517, 1519, 1521, 1523. Printer 1525 is connected to PIB 1509 and GMU 1507 over bus lines 1527, 1529. Base game integrated circuit board 1503, PIB 1509, and GMU 1507 connect to Ethernet switch 1531 over bus lines 1533, 1535, 1537. Ethernet switch 1531 connects to a slot management system (SMS) and a casino management system (CMS) network over bus line 1539. GMU 1507 also may connect to the SMS and CMS network over bus line 1541. Speakers 1543 connect through audio mixer 1545 and bus lines 1547, 1549 to base game integrated circuit board 1503 and PIB 1509. The proximity and biometric devices and circuitry may be installed by upgrading a commercially available PIB 1509, such as a Bally iView unit. Coding executed on base game integrated circuit board 1503, PIB 1509, and/or GMU 1507 may be upgraded to integrate a game having adjustable, multi-part, indicia as is more fully described herein.

Peripherals 1551 connect through I/O board 1553 to base game integrated circuit board 1503. For example, a bill/ticket acceptor is typically connected to a game input-output board 1553 which is, in turn, connected to a conventional central processing unit ("CPU") base game integrated circuit board 1503, such as an Intel Pentium microprocessor mounted on a gaming motherboard. I/O board 1553 may be connected to a base game integrated circuit board 1503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 1503 executes a game program that causes base game integrated circuit board 1503 to play a game. In one embodiment, the game program provides a slot machine game having adjustable multi-part indicia. The various components and included devices may be installed with conventionally and/or commercially available components, devices, and circuitry, into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 1553 to base game integrated circuit board 1503 which, in turn, assigns an appropriate number of credits for play in accordance with the game program. The player may further control the operation of the gaming machine by way of other peripherals 1551, for example, to select the amount to wager via electromechanical or touch screen buttons. The game starts in response to the player operating a start mechanism, such as a handle or touch screen icon. The game program includes a random number generator to provide a display of randomly-selected indicia on one or more displays.

In some embodiments, the random generator may be physically separate from gaming machine 1500. For example, the random generator may be part of a central determination host system which provides random game outcomes to the game program. Thereafter, the player may or may not interact with the game through electromechanical or touch screen buttons to change the displayed indicia. Finally, the base game integrated circuit board 1503 is under control of the game program, and the OS compares the final display of indicia to a pay table. The set of possible game outcomes may include a subset of outcomes related to the triggering of a feature game. In the event the displayed outcome is a member of this subset, the base game integrated circuit board 1503, under control of the game program and by way of I/O Board 1553, may cause feature game play to be presented on a feature display.

Predetermined payout amounts for certain outcomes, including feature game outcomes, are stored as part of the game program. Such payout amounts are, in response to instructions from base game integrated circuit board 1503, provided to the player in the form of coins, credits or currency via I/O board 1553 and a pay mechanism, which may be one or more of a credit meter, a coin hopper, a voucher printer, an electronic funds transfer protocol, or any other payout means known or developed in the art.

In various embodiments, the game program is stored in a memory device (not shown) connected to, or mounted on, the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 1507 includes an integrated circuit board and GMU processor and memory including coding for network communications, such as the G2S (game-to-system) protocol from the Gaming Standards Association, Las Vegas, Nev., used for system communications over the network. As shown, GMU 1507 may connect to card reader 1555 through bus 1557 and may thereby obtain player card information and transmit the information over the network through bus 1541. Gaming activity information may be transferred by the base game integrated circuit board 1503 to GMU 1507 where the information may be translated into a network protocol, such as S2S, for transmission to a server, such as a player tracking server, where information about a player's playing activity may be stored in a designated server database.

PIB 1509 includes an integrated circuit board, PID processor, and memory which includes an operating system, such as Windows CE, a player interface program which may be executable by the PID processor together with various input/output (I/O) drivers for respective devices which connect to PIB 1509, such as player interface devices 511, and which may further include various games or game components playable on PIB 1509 or playable on a connected network server and PIB 1509 is operable as the player interface. PIB 1509 connects to card reader 1555 through bus 1523, display 1559 through video decoder 1561 and bus 1521, such as an LVDS or VGA bus.

As part of its programming, the PID processor executes coding to drive display 1559 and provide messages and information to a player. Touch screen circuitry interactively connects display 1559 and video decoder 1561 to PIB 1509, such that a player may input information and cause the information to be transmitted to PIB 1509 either on the player's initiative or responsive to a query by PIB 1509. Additionally, soft keys 1565 connect through bus 1517 to PIB 1509 and operate together with display 1559 to provide information or queries to a player and receive responses or queries from the player. PIB 1509, in turn, communicates over the CMS/SMS network through Ethernet switch 1531 and busses 1535, 1539 and with respective servers, such as a player tracking server.

Player interface devices 1511 are linked into the virtual private network of the system components in gaming machine 1501. The system components include the iVIEW processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, and gaming machine configurations can be downloaded to the system components from the servers. This data is authenticated prior to installation on the system components.

The system components include the iVIEW processing board and game monitoring unit (GMU) processing board. The GMU and iVIEW can be combined into one device (e.g., the commercially available Bally GTM iVIEW device). This device may have a video mixing technology to mix the EGM processor's video signals with the iVIEW display onto the top box monitor or any monitor on the gaming device.

Figure 16:
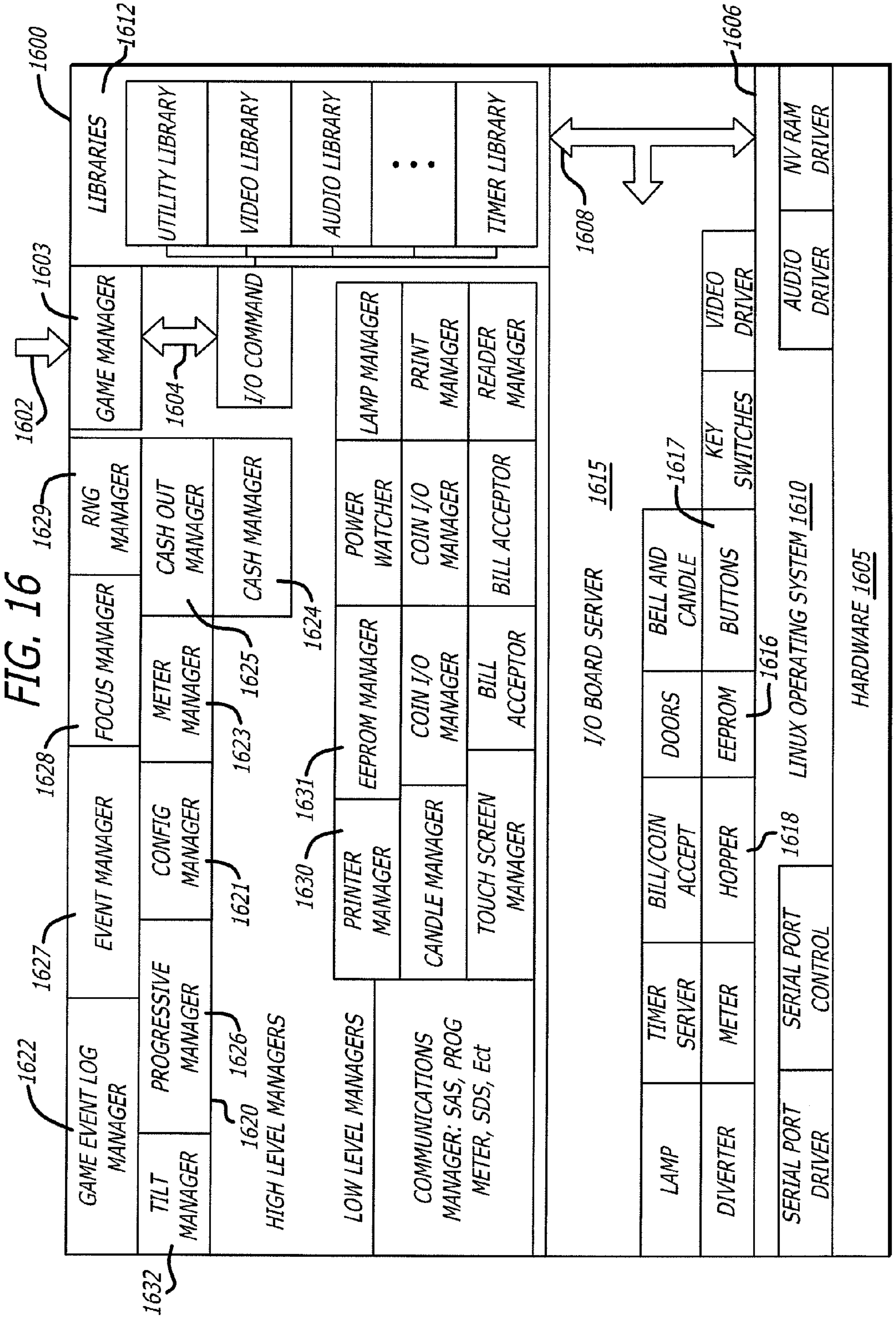
FIG. 16 is a block diagram of the logical components of a gaming kernel in accordance with one or more embodiments.

In accordance with one or more embodiments, FIG. 16 is a functional block diagram of a gaming kernel 1600 of a game program under control of base game integrated circuit board 1503. The game program uses gaming kernel 1600 by calling into application programming interface (API) 1602, which is part of game manager 1603. The components of game kernel 1600, as shown in FIG. 16, are only illustrative and should not be considered limiting. For example, the number of managers may be changed, additional managers may be added or some managers may be removed without deviating from the scope and spirit of the disclosed embodiments.

As shown in the example, there are three layers: a hardware layer 1605; an operating system layer 1610, such as, but not limited to, Linux; and a game kernel layer 1600 having game manager 1603 therein. In one or more embodiments, the use of a standard operating system 1610, such a UNIX-based or a Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 1600 executes at the user level of the operating system 1610, and itself contains a major component called the I/O Board Server 1615. To properly set the bounds of game application software (making integrity checking easier), all game applications interact with gaming kernel 1600 using a single API 1602 in game manager 1603. This enables game applications to make use of a well-defined, consistent interface, as well as making access points to gaming kernel 1600 controlled, where overall access is controlled using separate processes.

For example, game manager 1603 parses an incoming command stream and, when a command dealing with I/O comes in (arrow 1604), the command is sent to an applicable library routine 1612. Library routine 1612 decides what it needs from a device and sends commands to I/O Board Server 1615 (see arrow 1608). A few specific drivers remain in operating system kernel, shown as those below line 1606. These are built-in, primitive, or privileged drivers that are (i) general, (ii) kept to a minimum, and (iii) are easier to leave than extract. In such cases, the low-level communications is handled within operating system 1610, and the contents are passed to library routines 1612.

Thus, in a few cases library routines may interact with drivers inside operating system 1610, which is why arrow 1608 is shown as having three directions (between library utilities 1612 and I/O Board Server 1615, or between library utilities 1612 and certain drivers in operating system 1610). No matter which path is taken, the logic needed to work with each device is coded into modules in the user layer of the diagram. Operating system 1610 is kept as simple, stripped down, and common across as many hardware platforms as possible. The library utilities and user-level drivers change as dictated by the game cabinet or game machine in which it runs. Thus, each game cabinet or game machine may have a base game integrated circuit board 1503 connected to a unique, relatively dumb, and as inexpensive as possible I/O adapter board 1540, plus a gaming kernel 1600 which has the game-machine-unique library routines and I/O Board Server 1615 components needed to enable game applications to interact with the gaming machine cabinet. Note that these differences are invisible to the game application software with the exception of certain functional differences (e.g., if a gaming cabinet has stereo sound, the game application makes use of API 1602 to use the capability over that of a cabinet having traditional monaural sound).

Game manager 1603 provides an interface into game kernel 1600, providing consistent, predictable, and backwards-compatible calling methods, syntax, and capabilities by way of game application API 1602. This enables the game developer to be free of dealing directly with the hardware, including the freedom to not have to deal with low-level drivers as well as the freedom to not have to program lower-level managers 1630, although lower-level managers 630 may be accessible through game manager's interface 1602 if a programmer has a such a need. In addition to the freedom derived from not having to deal with the hardware level drivers and the freedom of having consistent, callable, object-oriented interfaces to software managers of those components (drivers), game manager 1603 provides access to a set of upper level managers 1620 also having the advantages of consistent callable, object-oriented interfaces, and further providing the types and kinds of base functionality required in casino-type games. Game manager 1603, providing all the advantages of its consistent and richly functional interface 1602 as supported by the rest of game kernel 1600, thus providing a game developer with a multitude of advantages.

Game manager 1603 may have several objects within itself, including an initialization object (not shown). The initialization object performs the initialization of the entire game machine, including other objects, after game manager 1603 has started its internal objects and servers in appropriate order. In order to carry out this function, the kernel's configuration manager 1621 is among the first objects to be started; configuration manager 1621 has data needed to initialize and correctly configure other objects or servers.

The upper level managers 1620 of game kernel 1600 may include game event log manager 1622 which provides, at the least, a logging or logger base class, enabling other logging objects to be derived from this base object. The logger object is a generic logger. Otherwise stated, the logger object is not aware of the contents of logged messages and events. The log manager's (1622) job is to log events in non-volatile event log space. The size of the space may be fixed, although the size of the logged event is typically not fixed. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 1623 manages the various meters embodied in the game kernel 1600. This includes the accounting information for the game machine and game play. There are hard meters (counters) and soft meters. The soft meters may be stored in non-volatile storage, such as non-volatile battery-backed RAM to prevent loss. Further, a backup copy of the soft meters may be stored in a separate, non-volatile storage such as EEPROM. In one embodiment, meter manager 1623 receives its initialization data for the meters, during startup, from configuration manager 1621. While running, the cash in (1624) and cash out (1625) managers call the meter manager's (1623) update functions to update the meters. Meter manager 1623 will, on occasion, create backup copies of the soft meters by storing the soft meters' readings in EEPROM. This is accomplished by calling and using EEPROM manager 1631.

In accordance with still other embodiments, the progressive manager 1626 manages progressive games playable from the game machine. The event manager 1627 is generic, like log manager 1622, and is used to manage various gaming machine events. The focus manager 628 correlates which process has control of various focus items. The tilt manager 1632 is an object that receives a list of errors (if any) from configuration manager 1621 at initialization, and during game play from processes, managers, drivers, and the like, that may generate errors. Random number generator manager 1629 is provided to allow easy programming access to a random number generator (RNG), as a RNG is required in virtually all casino-style (gambling) games. RNG manager 1629 includes the capability of using multiple seeds.

In accordance with one or more embodiments, a credit manager object (not shown) manages the current state of credits (cash value or cash equivalent) in the game machine, including any available winnings, and further provides denomination conversion services. The cash out manager 1625 has the responsibility of configuring and managing monetary output devices. During initialization, the cash out manager 1625, using data from configuration manager 1621, sets the cash out devices correctly and selects any selectable cash out denominations. During play, a game application may post a cash out event through the event manager 1627 (the same way all events are handled), and using a callback posted by cash out manager 1625, cash out manager 1625 is informed of the event.

The cash out manager 1625 updates the credit object, updates its state in non-volatile memory, and sends an appropriate control message to the device manager that corresponds to the dispensing device. As the device dispenses dispensable media, there will typically be event messages being sent back and forth between the device and cash out manager 1625 until the dispensing finishes. After this point, the cash out manager 1625, having updated the credit manager and any other game state (such as some associated with meter manager 1623) that needs to be updated for this set of actions, sends a cash out completion event to event manager 1627 and to the game application. The cash in manager 624 functions similarly to cash out manager 1625, only controlling, interfacing with, and taking care of actions associated with cashing in events, cash in devices, and associated meters and crediting.

In a further embodiment, in accordance with one or more embodiments, I/O server 1615 may write data to the gaming machine EEPROM memory, which is located in the gaming machine cabinet and holds meter storage that must be kept even in the event of power failure. The game manager 1603 calls the I/O library functions to write data to the EEPROM. The I/O server 1615 receives the request and starts a low priority EEPROM thread 1616 within I/O server 1615 to write the data. This thread uses a sequence of 8-bit commands and data writes to the EEPROM device to write the appropriate data in the proper location within the device. Any errors detected are sent as IPC messages to game manager 1603. Typically, all of this processing is asynchronous.

In accordance with one embodiment, button module 1617 within I/O server 1615, polls (or is sent) the state of buttons every 2 milliseconds. These inputs are debounced by keeping a history of input samples. Certain sequences of samples are required to detect that a button was pressed, in which case the I/O server 1615 sends an inter-process communication event to the game manager 1603 that a button was pressed or released. In some embodiments, the gaming machine may have intelligent distributed I/O which debounces the buttons, in which case button module 1617 may be able to communicate with the remote intelligent button processor to get the button events and simply relay them to the game manager 1603 via IPC messages. In still another embodiment, the I/O library may be used for pay out requests from the game application. For example, hopper module 1618 must start the hopper motor, constantly monitor the coin sensing lines of the hopper, debounce them, and send an IPC message to the game manager 1603 when each coin is paid.

Further details, including disclosure of lower-level, fault handling and/or processing, are included in U.S. Pat. No. 7,351,151 entitled "Gaming Board Set and Gaming Kernel for Game Cabinets" and provisional U.S. Patent App. No. 60/313,743, entitled "Form Fitting Upgrade Board Set For Existing Game Cabinets," filed Aug. 20, 2001, both patent and provisional application are incorporated by reference herein in their entirety.

Figure 17:
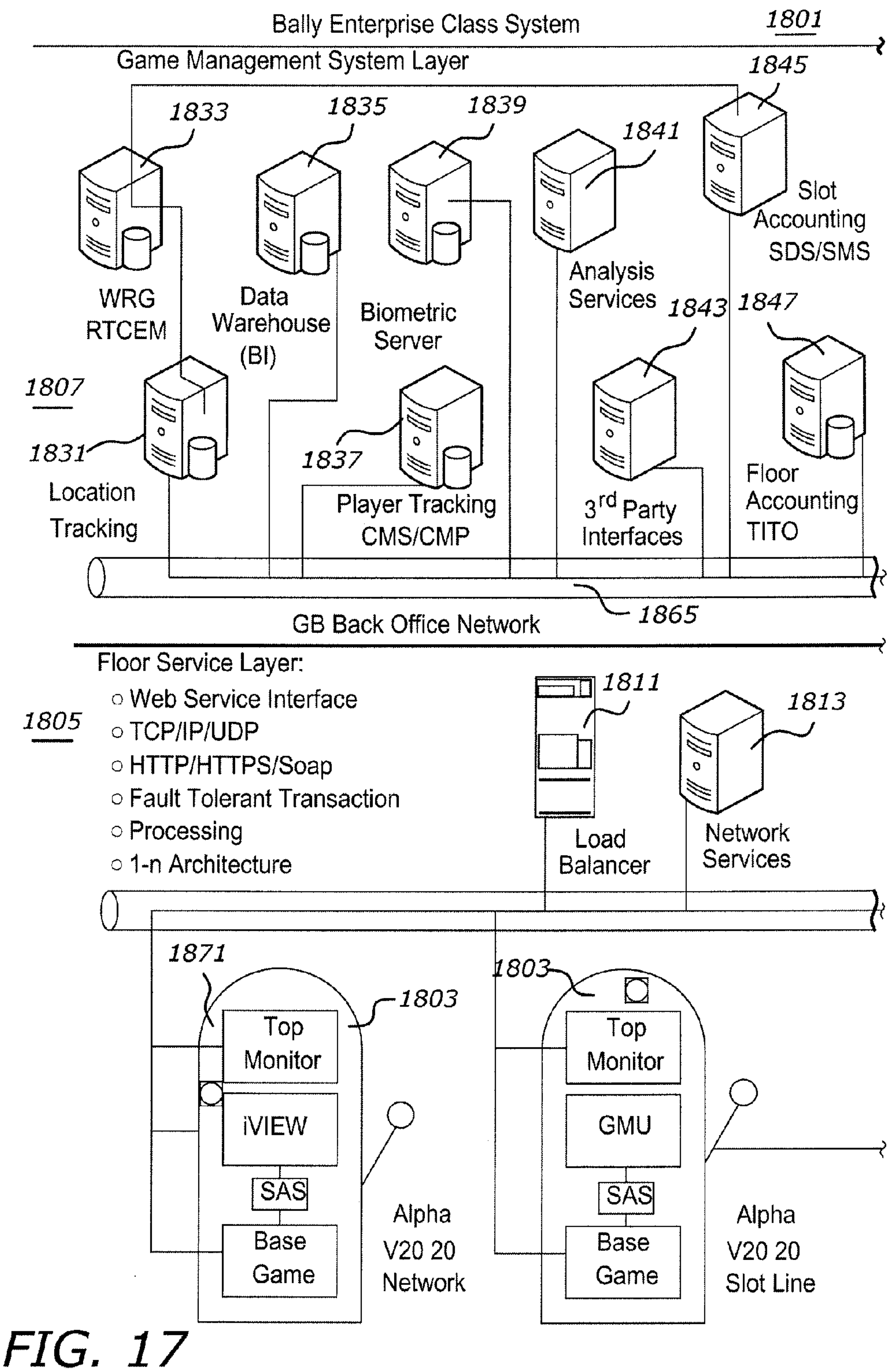
FIG. 17 is a schematic block diagram showing the hardware elements of a networked gaming system in accordance with one or more embodiments.
Figure 18:
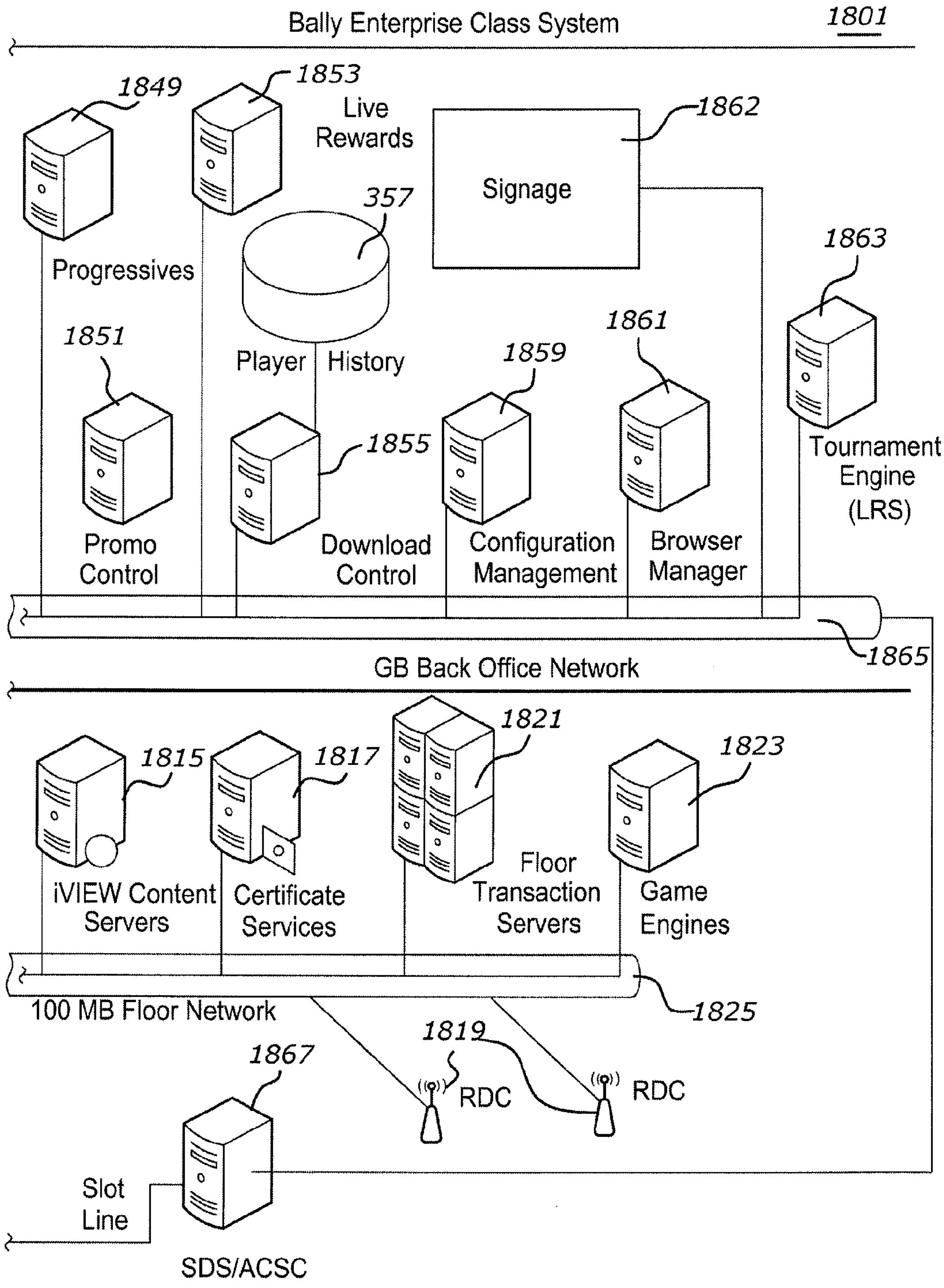
FIG. 18 is a schematic block diagram showing the hardware elements of a networked gaming system in accordance with one or more embodiments.

Referring to FIGS. 17 and 18, enterprise gaming system 1801 is shown in accordance with one or more embodiments. Enterprise gaming system 1801 may include one casino or multiple locations and generally includes a network of gaming machines 1803, floor management system (SMS) 1805, and casino management system (CMS) 1807. SMS 1805 may include load balancer 1811, network services servers 1813, player interface (iVIEW) content servers 1815, certificate services server 1817, floor radio dispatch receiver/transmitters (RDC) 1819, floor transaction servers 1821 and game engines 1823, each of which may connect over network bus 1825 to gaming machines 1803. CMS 1807 may include location tracking server 1831, WRG RTCEM server 1833, data warehouse server 1835, player tracking server 1837, biometric server 1839, analysis services server 1841, third party interface server 1843, slot accounting server 1845, floor accounting server 1847, progressives server 1849, promo control server 1851, feature game (such as Bally Live Rewards) server 1853, download control server 1855, player history database 1857, configuration management server 1859, browser manager 1861, tournament engine server 1863 connecting through bus 1865 to server host 1867 and gaming machines 1803.

The various servers and gaming machines 1803 may connect to the network with various conventional network connections (such as, for example, USB, serial, parallel, RS485, Ethernet). Additional servers which may be incorporated with CMS 1807 include a responsible gaming limit server (not shown), advertisement server (not shown), and a control station server (not shown) where an operator or authorized personnel may select options and input new programming to adjust each of the respective servers and gaming machines 1803. SMS 1805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 1803 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 1807 and/or SMS 1805 servers and devices, firmware, media, operating systems, and configurations may be downloaded to the system components of respective gaming machines for upgrading or managing floor content and offerings in accordance with operator selections or automatically depending upon CMS 1807 and SMS 1805 master programming. The data and programming updates to gaming machines 1803 are authenticated using conventional techniques prior to installation on the system components.

In various embodiments, any of the gaming machines 1803 may be a mechanical reel spinning slot machine, video slot machine, video poker machine, keno machine, video blackjack machine, or a gaming machine offering one or more of the above-described games, including a group play game. Alternately, gaming machines 1803 may provide a game with a skill-based component as a primary or base game or as one of a set of multiple primary games selected for play by a random number generator, as described above. A gaming system of the type described above also allows a plurality of games in accordance with the various embodiments of the pseudo skill-based game 100 to be linked under the control of a group game server (not shown) for cooperative or competitive play in a particular area, carousel, casino or between casinos located in geographically separate areas. For example, one or more examples of group games under control of a group game server are disclosed in U.S. patent application Ser. No. 11/938,079, entitled "Networked System and Method for Group Play Gaming," filed on Nov. 9, 2007, which is hereby incorporated by reference in its entirety for all purposes.

The above-disclosed embodiments relate to a pseudo skill-based bonus game in FIGS. 1-18. In these embodiments of the pseudo skill-based bonus game, players use the iDeck™ to shoot virtual missiles at virtual space ships on a playing field. Points are awarded for correct hits, and credits may be awarded for some hits using a technique to ensure that no matter how skillful the player is in aiming at the targets, the same amount of credits are awarded.

Figure 19:
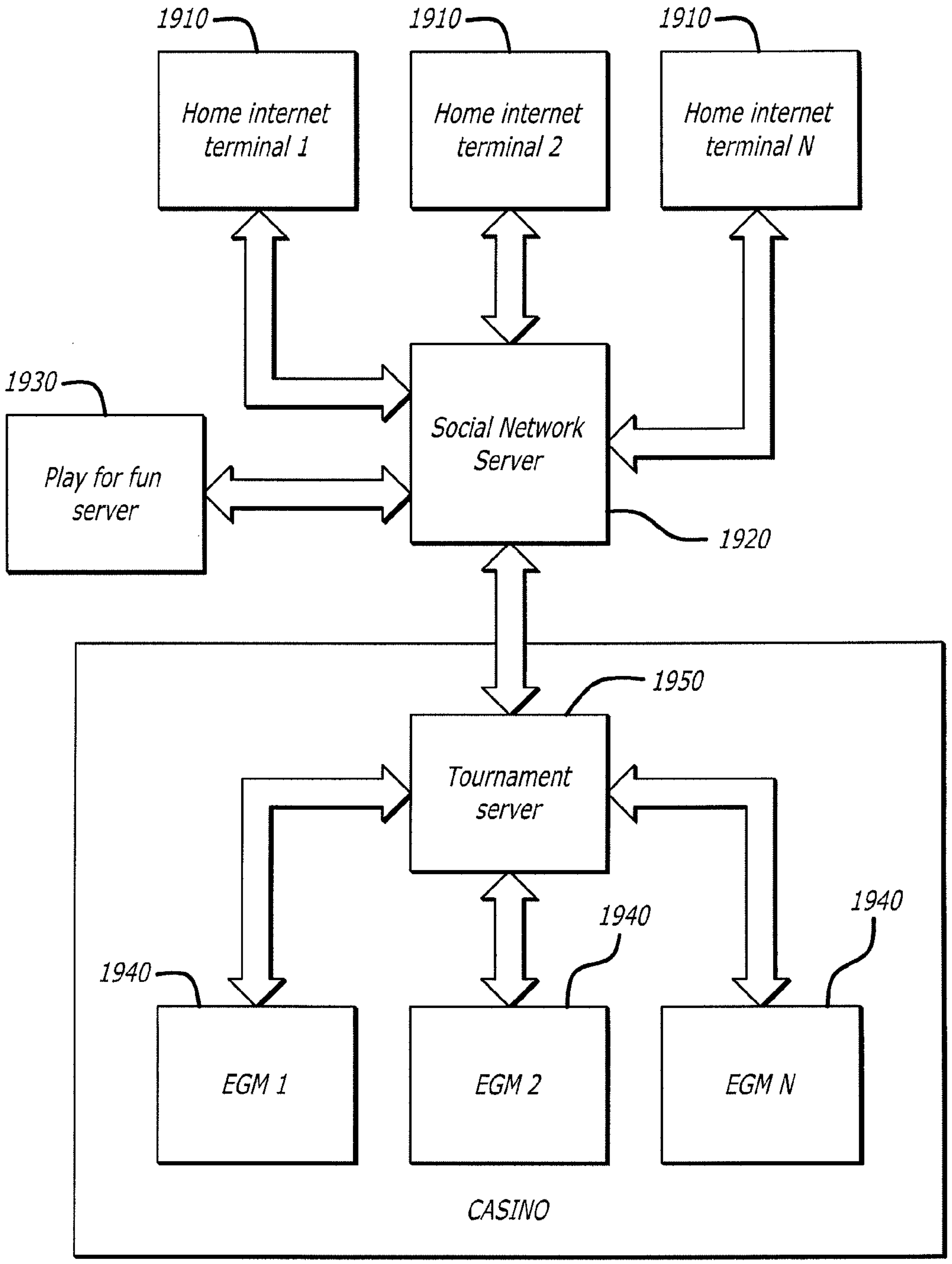
FIG. 19 is a schematic block diagram showing the hardware elements of a tournament gaming system employing social network based team formation.
Figure 20:
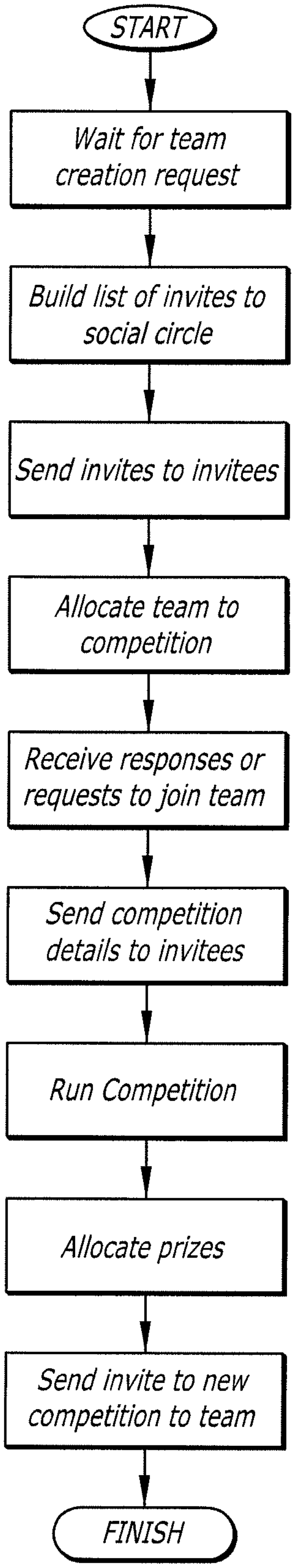
FIG. 20 is a logic flow diagram of a tournament gaming system employing social network based team formation.
Figure 21:
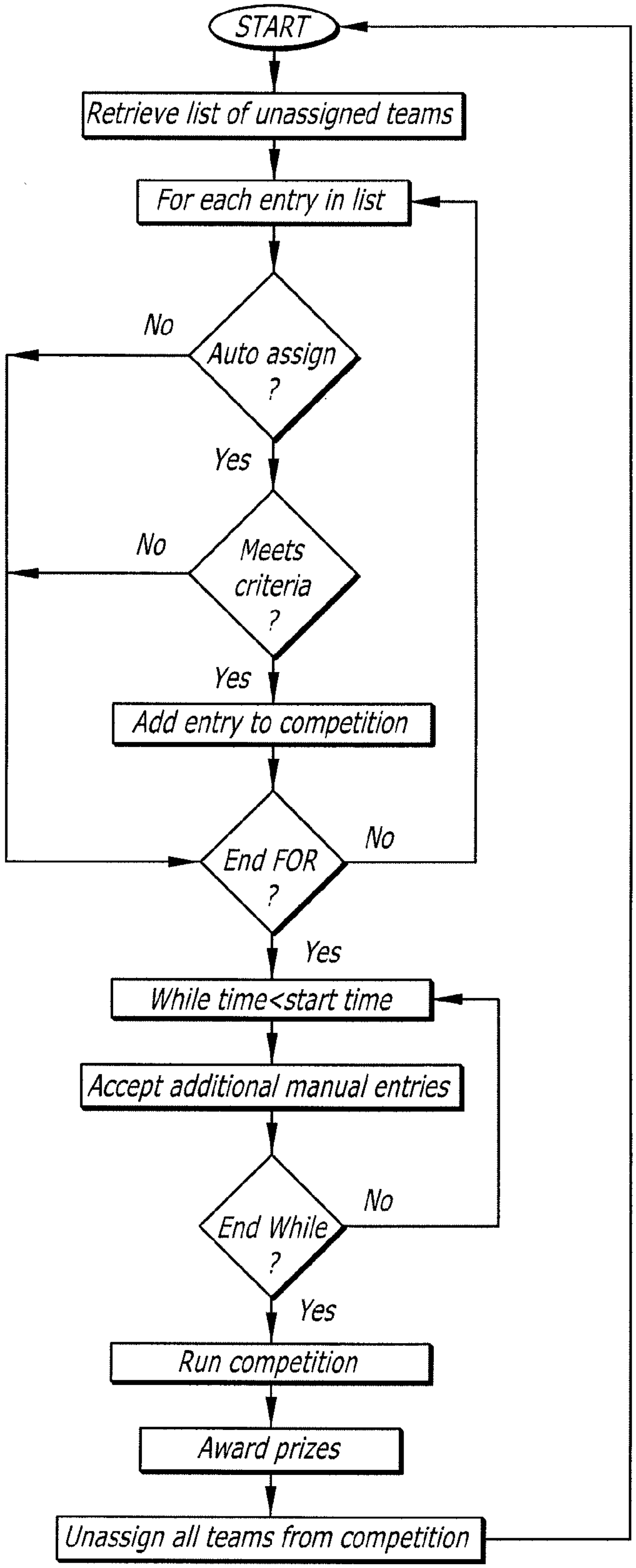
FIG. 21 is another logic flow diagram of a tournament gaming system employing social network based team formation.

Tournament Gaming System Using Social Network Based Team Formation:

Referring now to FIGS. 19-21, the following disclosure is related to various embodiments of a Tournament Gaming System employing Social Network-Based Team Formation 1900 that uses the normally non-paying points as an incentive for players to return to the casino for further play. As discussed above, a leaderboard is typically maintained of the highest scores attained by players during the bonus feature.

In one aspect of the Tournament Gaming System employing Social Network Based Team Formation 1900, multiple leaderboards may be maintained. While each EGM may maintain its own individual leaderboard, in some embodiments casino-wide or bank-wide leaderboards are maintained and displayed, either on signage, or periodically on each EGM.

In one embodiment of the Tournament Gaming System employing Social Network Based Team Formation 1900, the casino-wide leaderboards are used for periodic tournaments. Preferably, multiple leaderboards are maintained so that different skill, bet, or club level players may be matched against each other. A preferred technique for implementation is described below.

In one aspect of the Tournament Gaming System employing Social Network Based Team Formation 1900, while players may play as an individual, gaining a high score only for bragging rights, they may also play as part of a team. As a team, they are eligible to enter the periodic tournaments organized by the casino. In a basic scenario, a casino may elect to run a tournament over a period of time (e.g., a weekend). As players within teams play the gaming machines with the bonus game, scores are posted onto the leaderboard. The teams with the highest scores at the end of the tournament period win the prizes.

One embodiment of the Tournament Gaming System employing Social Network Based Team Formation 1900 optimally uses social networks to enable players to form teams. Preferably an existing social network such as Facebook is used. One embodiment of the configuration of the system 1900 is shown in FIG. 19. In FIG. 19, users connect to a social network server 1920 from internet terminals 1910. As shown, in one embodiment the terminals may be located in the home as web browsers, but in other embodiments the primary access devices are smart phones (not shown), running either dedicated applications or mobile browsers.

Players may access a "Play for Fun" (PFF) version of the game via the social network server 1020. Typically, this application is hosted on a separate server 1930, which interfaces to the social network server 1020 using standard APIs such as Facebook. The PFF version may differ from the conventional casino game in that it only consists of the skill bonus round, and no cash prizes may be awarded. Alternatively, the PFF version may be a free-to-play version of the casino game, periodically awarding entry into the bonus round as happens in the casino. In this scenario, players may only have a limited number of free play credits per day, and to obtain more credits they may purchase them as In-App-Purchases (IAP). While players may purchase additional credits to practice more, in the PFF version of the game there are never prizes awarded. The PFF game enables the Tournament Gaming System 1900 to attract players to the tournament, and by extension to the casino, allowing them to practice away from the casino, and providing a means for players to measure their skill against other players and other teams.

The social network server 1920 also hosts one or more leaderboard for each casino with which it has an association. For example, a casino may have a "Facebook Page" (FP), and within this page one or more leaderboards may be displayed for tournaments in progress. Icons may also be displayed on the FP to allow players to initiate the creation of a team, or joining an existing team.

Teams are an important aspect of the Tournament Gaming System employing Social Network Based Team Formation 1900. Players form teams that compete in a tournament to gain the highest score playing the bonus game in the casino. Unlike conventional slot tournaments, which force players to play concurrently over a short period of time, in the Tournament Gaming System employing Social Network Based Team Formation 1900, the tournament period is expected to last a period of days, and players within teams may make single or multiple visits to the casino during this period to post a score.

The basic lifecycle of one embodiment of a tournament is shown in FIG. 20. First, a player forms a team, initially consisting solely of themselves. In some implementations this is done by the player selecting "form team" from a user interface presented on the casino's FP. The player is then given the opportunity to issue invitations to join the team to friends in their friends list, via email, or other contact methods. By leveraging existing social networks, the Tournament Gaming System employing Social Network Based Team Formation 1900 makes it much easier for players to form teams. The invitations are sent to other potential team members and then the team is allocated to a tournament. Initially, a team consisting of new players is allocated to a default tournament, but over time other tournaments may be chosen depending upon some criteria.

In one embodiment of the Tournament Gaming System Using Social Network Based Team Formation 1900, multiple tournaments may overlap such that when a team is allocated to a tournament, the tournament is not yet started. While a team must be enrolled in a tournament before it begins to be eligible for prizes, it may be preferable that team members may be able to respond to the invitation after the tournament begins. Thus, a team may continue to grow in size. Regardless of how formation occurs, in some embodiments individual team members may only be members of one team in a particular casino at any one time.

As each team member joins the team, they are sent an email or other type of message giving them information on the tournament and the social network webpage with which it is associated. Members may use this information to track the tournament leaderboards as they are updated on the social network.

During the tournament period, players are encouraged to visit the casino and participate. Team creators may send messages to their team giving such encouragement, and the casino may auto-generate messages to teams that are jockeying for winning positions. In this manner, as the lead changes the new and old leading teams may be informed.

In another aspect of the Tournament Gaming System employing Social Network Based Team Formation 1900, the system enables teams to be formed of arbitrary size. To achieve this type of team formation, in one embodiment a team creator may invite as many friends as they like to join the team. Each of these members may join and play the game. During the tournament, only the current top N (e.g., five) team member high scores are used to compute an aggregate team high score. This embodiment does not discriminate against teams of at least a minimum size, while allowing teams to not have to be of a fixed size. In this manner, teams of various sizes may compete against each other by only using a top few number of scores. For example, a team of five may compete against a team of eight and a team of twelve. In this scenario, the top five scores of each team could be used for the competition. In other embodiment, alternative methods of ranking teams in tournaments may use the mean score of team members, the mean score of the top N members, or different weightings for different team sizes.

Many gaming advances are designed to increase the total coin-in. While the tournament in itself encourages more play, in some embodiments it is advantageous to weight team member contributions by average or instant bet at the time of playing the bonus round. In this manner, a player betting five (5) credits per line may be given a bonus score that is five (5) times the score of someone betting one credit per line. Alternatively, a fixed bonus amount may be given to players depending upon their bet at the time of the bonus round.

In a further enhancement, players may be given additional bonus amounts or multipliers to their score depending upon their loyalty club level. A platinum level player may therefore be given a higher multiplier than a silver level player. In yet another embodiment, players may be given additional bonus amounts or multipliers to their score depending upon a combination of multiple factors, including by way of example only, and not by way of limitation, their loyalty club level, instant bet, average bet, and the like. At the end of the tournament period, the leaderboard is used to determine prizes to be awarded. Prizes may be awarded for the highest scoring team(s) and also possibly for the highest scoring individual members of teams.

As described with respect to FIG. 21, once prizes are awarded, teams may be automatically entered into new competitions. In some embodiment, as teams finish a tournament, a list is generated of these teams for assignment to new tournaments. In such an embodiment, in the event of a casino running multiple tournaments concurrently, more than one tournament may finish at or around the same time (e.g., at the end of the weekend). Accordingly, the process shown in FIG. 21 may only be run periodically to ensure that teams from multiple tournaments may be considered for a new tournament.

In one embodiment, a reason for considering teams from multiple tournaments relates to the variance between team performances. As such, it is a feature of some embodiments of the Tournament Gaming System employing Social Network Based Team Formation 1900 that tournaments are "balanced" according to some criteria, with similar teams being matched together. Some examples of balancing criteria include the following which are listed by way of example only, and not by way of limitation. Regarding a first balancing criteria, teams with similar tournament scores are matched together. These balancing criteria make tournaments more competitive. Regarding a second balancing criteria, teams with similar total bets throughout the last tournament they participated in are matched together. This balancing criteria enables teams with excess members (who do not contribute to the highest scores) to participate in higher stakes tournaments. Regarding a third balancing criteria, teams with higher club level memberships are matched together. These balancing criteria encourage higher overall slot play to participate in higher prize tournaments. Regarding a fourth balancing criteria, teams that have won a tournament in a previous period of time are matched together. These balancing criteria enable a "champion of champions" tournament to be held for a higher prize or bragging rights.

Embodiments of the system 1900 that use balancing techniques enable players and teams to "find their own level." Lower stakes players may still compete against each other, but higher skilled teams may be encouraged to bet higher so that they may compete for bigger prizes against other high skill teams. In some embodiments, some tournaments are only available to certain classes of players (e.g., platinum players only, or at least one platinum member per team).

Prizes for winning tournaments need not be cash-based in accordance with embodiments of the system 1900. A tournament for gold club level players may offer the chance to win platinum level privileges for a period of time. In one embodiment, club point multipliers may be won if a player is part of a team that wins a 2× multiplier, then all points they earn in the player club for the next week are multiplied by two. In some embodiments, cash-based prizes may be funded uses marketing funds, or other funds not related to the "coin-in" of the gaming machines being played.

Returning to the process shown in FIG. 21, in some embodiments, some teams may elect to be automatically assigned to the best tournament available (i.e., the one with the largest prize). In other embodiments, other team leaders may elect to have their team not automatically assigned. Instead, after a tournament finishes they may manually enter any tournament for which they are eligible. In this case, while they may not be eligible for high prize tournaments if their skill, bet or club membership level does not support such tournaments level access, the players may also not be eligible for lower prize tournaments if their skill level has proven to be of too high a standard. So long as multiple tournaments are running concurrently, this prevents high skill players from preying on weaker teams, in some embodiments of the Tournament Gaming System Using Social Network Based Team Formation 1900.

In some embodiments of the Tournament Gaming System Using Social Network Based Team Formation 1900, players may form teams at home, but must return to the casino to play the game and win prizes. Advantageously, the system 1900 uses existing social networks to leverage pre-existing relationships between players to form teams. The use of existing social networks also makes developing tournament user interface easier by employing a non-gaming platform. Continuing, the system 1900 balances multiple competitions to maintain player interest and match suitable sets of players. In one embodiment, the Tournament Gaming System Using Social Network Based Team Formation 1900, encourages use of player cards such that players must associate a player card number with their Facebook account to participate in a team. Moreover, the free-to-play game feature of the system 1900 encourages players to try the game for real and to practice without cost.

In one embodiment of the Tournament Gaming System Using Social Network Based Team Formation 1900, an EGM runs the Total Blast game bonus (or other similar game). In another embodiment of the Tournament Gaming System Using Social Network Based Team Formation 1900, an Ethernet connection links each gaming machine 1940 to a tournament server 1950. In still another embodiment of the Tournament Gaming System Using Social Network Based Team Formation 1900, an internet-based social network application, hosted on an external server, provides the free-to-play version of the bonus game, team management for users, displays current high scores from tournament server 1950, and sends team information to the tournament server.

One embodiment of the Tournament Gaming System Using Social Network Based Team Formation 1900 enables: (1) forming teams on social networks to play at a casino; (2) balancing multiple tournaments based on criteria such as skill, bet and player club level; (3) implementing a practice version of game on non-gaming platform allowing players to hone their skills for later tournament participation; (4) implementing a practice version of game that consists only of bonus round, and no underlying casino game; and (5) updating scores from gaming machines to social network allowing notification of tournament status to players away from casino.

In another aspect of some embodiments, gaming systems are utilized that include mobile gaming capabilities 2200. In such embodiments of the disclosed gaming system, smart phones are utilized that include built in object recognition technologies and OCR (Optical character recognition) techniques combined with location/orientation derivation to provide players in casinos with additional gaming options and opportunities. In one embodiment of a gaming system that includes mobile gaming capabilities 2200, the gaming system leverages the possession by players of smart phones to enable the manufacturer to build profiles of players and target valuable players for promotions of key products of the manufacture.

Figure 22:
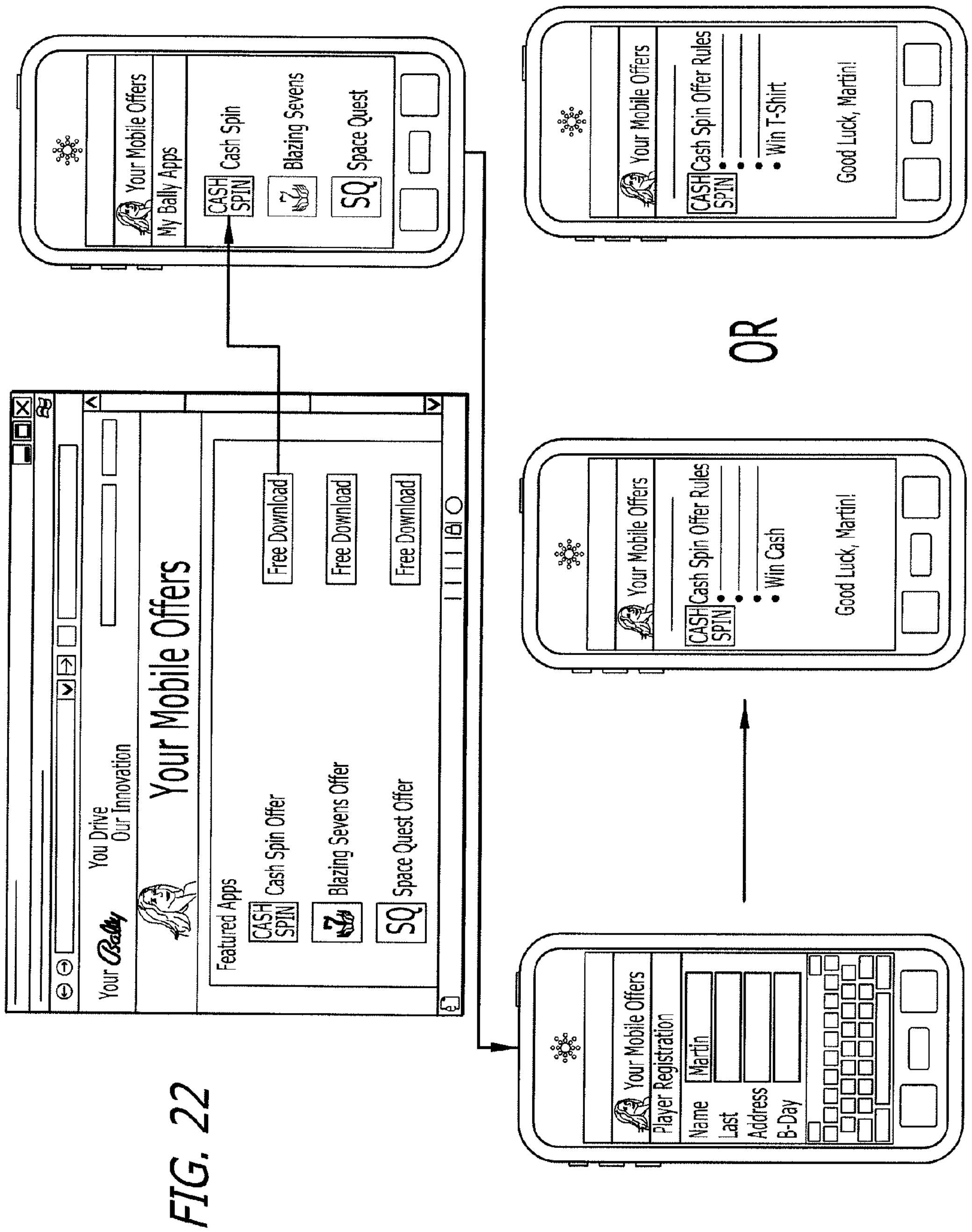
FIG. 22 illustrates a diagram of a download and registration process for an example iBonus game played on a mobile smart phone.
Figure 23:
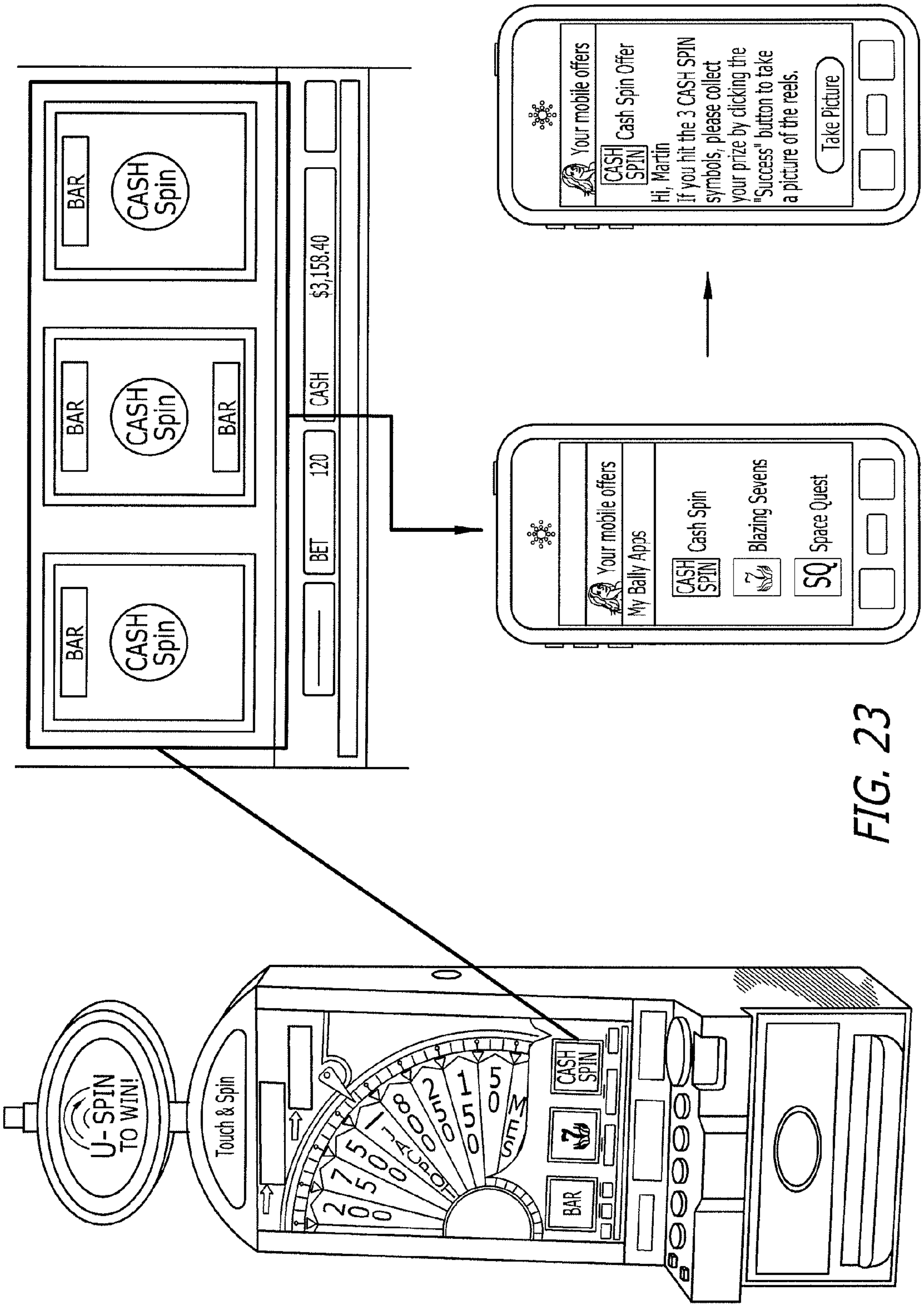
FIG. 23 illustrates a diagram of a game play process on an example iBonus game played on a mobile smart phone.
Figure 24:
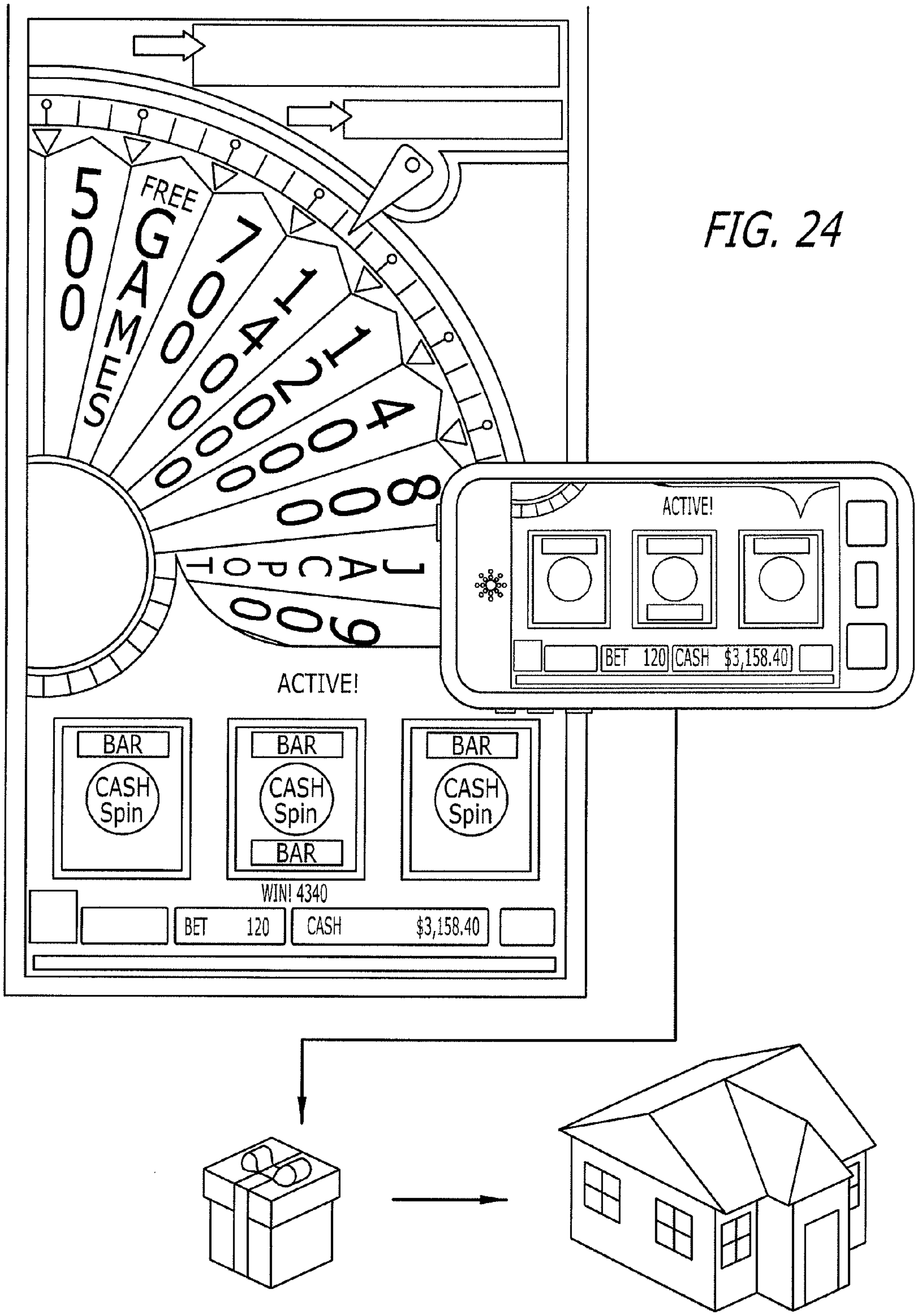
FIG. 24 illustrates a diagram of a bonus award process on an example iBonus game played on a mobile smart phone.

Referring now to FIGS. 22-24, the overall arrangement of the modules that make up an embodiment of a gaming system having mobile gaming capabilities 2200 is shown. In some embodiments of the gaming system having augmented reality gaming capabilities 2200, the gaming process proceeds in the following manner. A player downloads the "iBonus" application from an Application Store (e.g., a gaming manufacturer's application store, the Apple Application store, the Goggle Application Store, or the like) onto their smart phone. The player uses the iBonus application to enroll in the iBonus system. The iBonus application then displays a list of targeted promotions.

In one embodiment, a promotion may be "Hit 3 Cash Spin symbols to win a free Cash Spin t-shirt." The player then goes to the casino and plays Cash Spin. Once the player meets the requirements of the promotion, such as by hitting a combination that includes three Cash Spin symbols, the player takes out their phone, selects the iBonus application, and uses the inbuilt camera (controlled by the iBonus application) to take a photo of the game result. The iBonus Application securely transmits the photo to a web service, where the photo is analyzed to confirm that the player has indeed met the terms of the promotion. Once confirmed, the player is awarded the bonus by mail or electronically.

Figure 25:
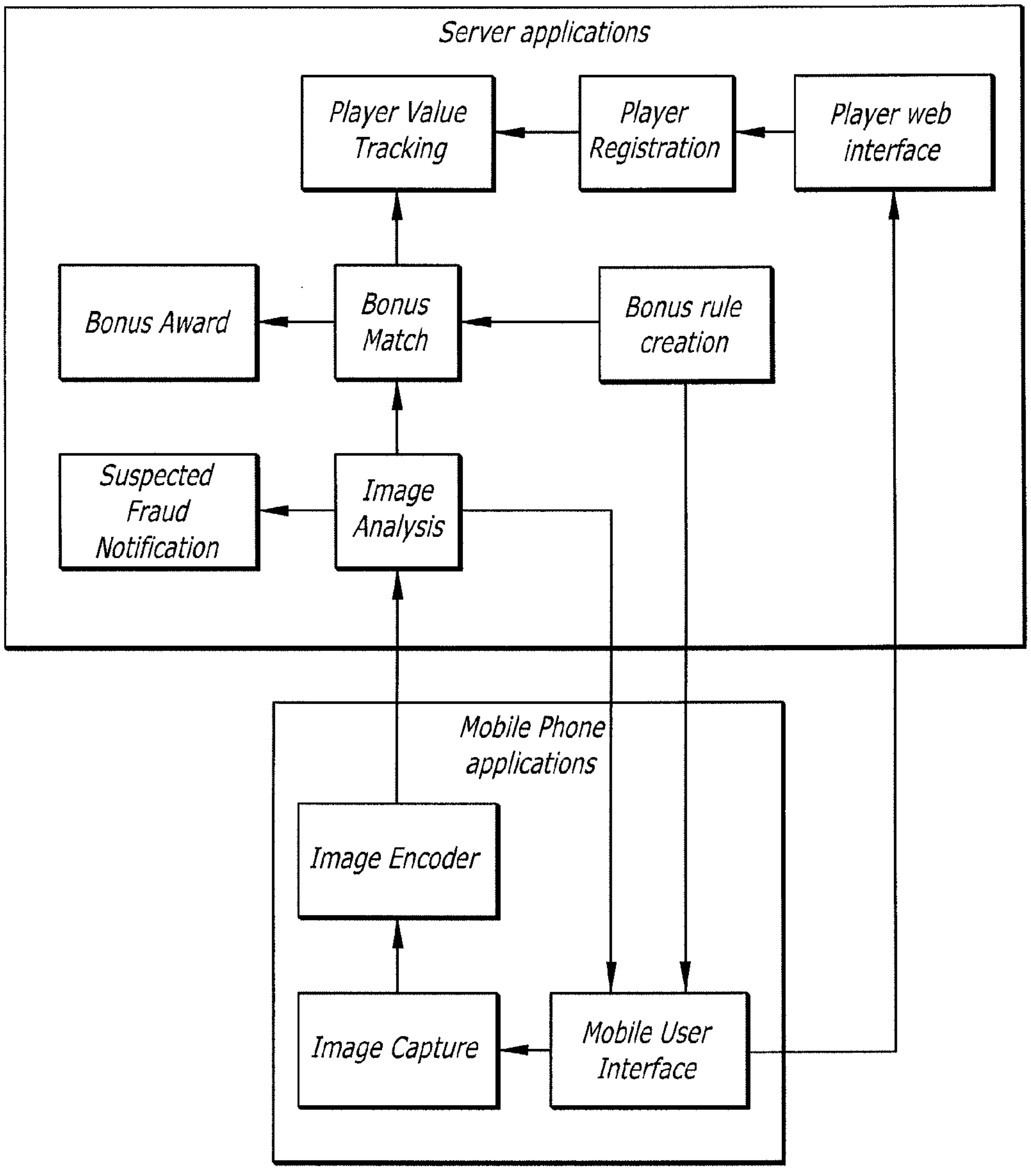
FIG. 25 illustrates a system overview of an iBonus system.

Referring now to FIG. 25, an embodiment is shown that displays the general arrangement of logical modules in the gaming system having mobile gaming capabilities 2200. These modules include, by way of example only, and not by way of limitation: Player Value Tracking, Player Registration, Player Web Interface, Bonus Match, Bonus Award, Bonus Rule Creation, and Image Analysis.

Regarding the Player Value Tracking feature of the gaming system having mobile gaming capabilities 2200, as players register, they are added to a database managed by the Player Value Tracking module. Initially, a player is assigned a zero value. Otherwise stated, the player will be offered bonuses available to all other players in their demographic (such as location/jurisdiction or age). As players participate in the bonus system their value may go up based upon their average bet, and thus they may be offered higher value, more targeted bonuses. The important difference between this module and a conventional player tracking system is that instead of each wager made by the player contributing to the value, this system only tracks events captured by the mobile phone application, which are generally bonus-qualifying wins.

Referring now to the Player Registration feature of the gaming system having mobile gaming capabilities 2200, the player registration module handles the creation of new records for the Player Value Tracking system. Since fraud prevention is an important facet of the disclosed gaming system, the player registration module generally requires some identification data to ensure that players do not register multiple accounts. A simple way to achieve this is to use an online service such as an online Application Store as a means of downloading the smart phone application. After being downloaded, each application may be electronically "fingerprinted" so as to be tied to one smart phone account and/or smart phone, without requiring payment from the player.

Regarding the Player Web Interface feature of the gaming system having mobile gaming capabilities 2200, the player web interface provides some other important functionality, in addition to providing a portal to the Player Registration module. Initially, the web interface provides general advertising of the iBonus system and current promotions within. This advertising may also be accessed from the smart phone application. Furthermore, the web interface provides the ability to push updates to the smart phone application. As an anti-hacking measure, the software and encryption keys on the smart phone are periodically updated to increase the cost of reverse engineering the communication protocol beyond the economic value of any bonuses fraudulently earned.

Referring now to the Bonus Match feature of the gaming system having mobile gaming capabilities 2200, once an image or image set has been analyzed to determine the state of the gaming machine at capture time, the correct bonus to be awarded can be calculated. In this manner, the Bonus Match module parses the list of possible bonuses to generate a list of matching bonuses. It is expected that each possible bonus record would include some or all of the following fields, including but not limited to: Type of bonus, Game Identifier, Game qualifying conditions, Bet qualifying conditions, Geographic restrictions, Demographic restrictions, Time restrictions, and Quantity.

In some embodiments of the gaming system having mobile gaming capabilities 2200, the "Type Of Bonus" may be physical or virtual. A physical bonus may be an item such as a t-shirt or a prepaid debit card, while a virtual bonus may be loyalty points that can be redeemed for physical items or funds. In another aspect of some embodiments, the "Game Identifier" is the name of the game being "bonused." In still another aspect, the "Game Qualifying Conditions" are the symbols or game state that must be matched. For example, in one embodiment, the symbol qualifying condition is "4 or more scatter symbols," and a game state may be "a win above >$100." In yet another aspect, the "Bet Qualifying Conditions" are a bonus that may be restricted to a minimum denomination and/or other conditions such as a minimum number of lines played, or a minimum total bet.

Continuing, in some embodiments of the gaming system having mobile gaming capabilities 2200, the "Geographic Restrictions" file includes some combination of a cell tower identifier, a reverse DNS lookup, and a GPS address to restrict the eligibility of some bonuses. In another aspect of some embodiments, the "Demographic Restrictions" file includes some bonuses that are available to players in certain demographic groups such as age-ranges. In still another aspect, the "Time Restrictions" field includes bonuses that may be only available at certain times of the week or for a fixed length of time. Finally, in yet another aspect of one embodiment, the "Quantity" filed includes the ability to set a limit on the number of redemptions before the bonus expires.

Desirably, the combining of these attributes enables a manufacturer to generate some interesting promotion types. For example, in some embodiments, the manufacturer may choose to offer an "ad-hoc" tournament to certain players. In such an embodiment, the players are sent a message telling them, for example, that if the players play "Cash-Spin" from 7:30 PM to 11:30 PM on Independence Day, the first fifty players to hit the Cash Spin will be awarded an extra prize.

Figure 26:
FIG. 26 illustrates a smart phone that is displaying an Ad Hoc tournament on a mobile smart phone.

In another embodiment of the gaming system having mobile gaming capabilities 2200, tournaments are formed by having bonus awards predicated upon the highest wins by players participating over a period of time. For example, in one embodiment, the manufacturer sends a message to targeted players, informing the players that the highest win on a Blazing 7s game between 8:00 PM and 9:00 PM on Tuesday will win a bonus of $1000. In such a scenario, each player participating during this time would be encouraged to take photos of significant wins, and at the end of the period the player with the highest win submitted would win the bonus. Notably, as shown in FIG. 26, the smart phone application may also be used to enter the tournament. Next, updates would be pushed to all of the smart phones of the participating players every time the leader board changed, thus enabling the players to monitor their positions in the tournament rankings. At the completion of the tournament, any awards may be notified directly to players through the smart phone application.

Referring now to FIG. 25, the Bonus Match Module interfaces with the Player Value Tracking module in that all data captured by the Bonus Match Module (e.g., the arrangement of symbols, denomination, current credits played) are passed to the Player Value Tracking module so that a history of interaction for each player may be generated. This data may be used to compute an average bet for a player (and thus their value to casinos) and also to determine the particular game types (e.g., high volatility) that a player prefers to play.

Referring now to the Bonus Award module of the gaming system having mobile gaming capabilities 2200, this module performs the function of distributing awards to players. In one more basic embodiment, players may be awarded physical awards such as t-shirts or prepaid debit cards, which may be mailed out to the players. In another aspect of some embodiments, a loyalty points program is implemented that enables players to accumulate points to be redeemed for larger awards.

Regarding the Bonus Rule Creation feature of the gaming system having mobile gaming capabilities 2200, each bonus is constructed from a set of rules such as those described above. In some embodiments, bonuses may be created from these rules by using a GUI (graphical user interface). However, in other embodiments, Business Intelligence may be used to target the players who would benefit from some bonuses. In one such embodiment, if a manufacturer launches "Cash Spin 2," the manufacturer may target players who had previously won a bonus playing "Cash Spin" as being eligible for a special bonus opportunity.

Figure 27:
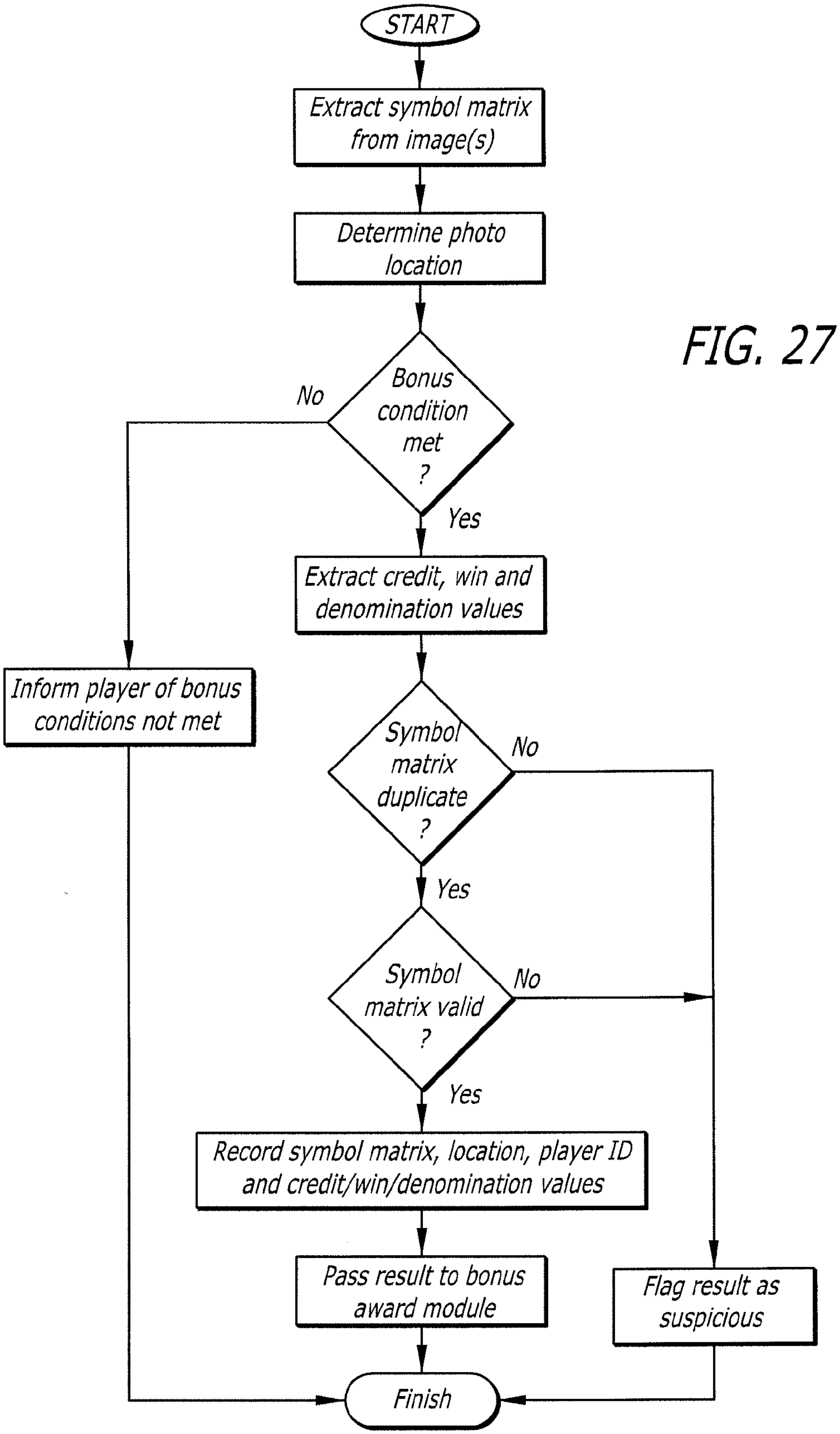
FIG. 27 illustrates a logic flow diagram of an image analysis process.

Referring now to the Image Analysis module of the gaming system having mobile gaming capabilities 2200, the processes of this module are shown in FIG. 27. The image analysis module performs two major functions: (1) determination of the arrangement of symbols present in the photo taken by the player; and (2) detection of attempted fraud. In some embodiments, the first task that the image analysis module performs upon receiving an image from the smart phone application is the extraction of the symbol matrix from the image. Standard image analysis techniques are utilized, such as the OpenCV software library. In one aspect of this embodiment, the image analysis has copies of all of the candidate symbol images that may be detected. From this library of images, the arrangement of symbols on the screen may be determined. Notably, in another embodiment, manual intervention may be used. In such an embodiment, a person located at a manufacturer's office quickly analyzes a photo and enters the arrangement of symbols into the Image Analysis system.

In another aspect of the gaming system having mobile gaming capabilities 2200, additional data may be sent from the smart phone to assist in automatic image analysis. The smart phone location (i.e., "geotag") information may be used to narrow down the number of possible games against which to compare. Such a location may be determined by various combinations of the phone's GPS position, IP address, and/or smart phone tower location.

Figure 28:
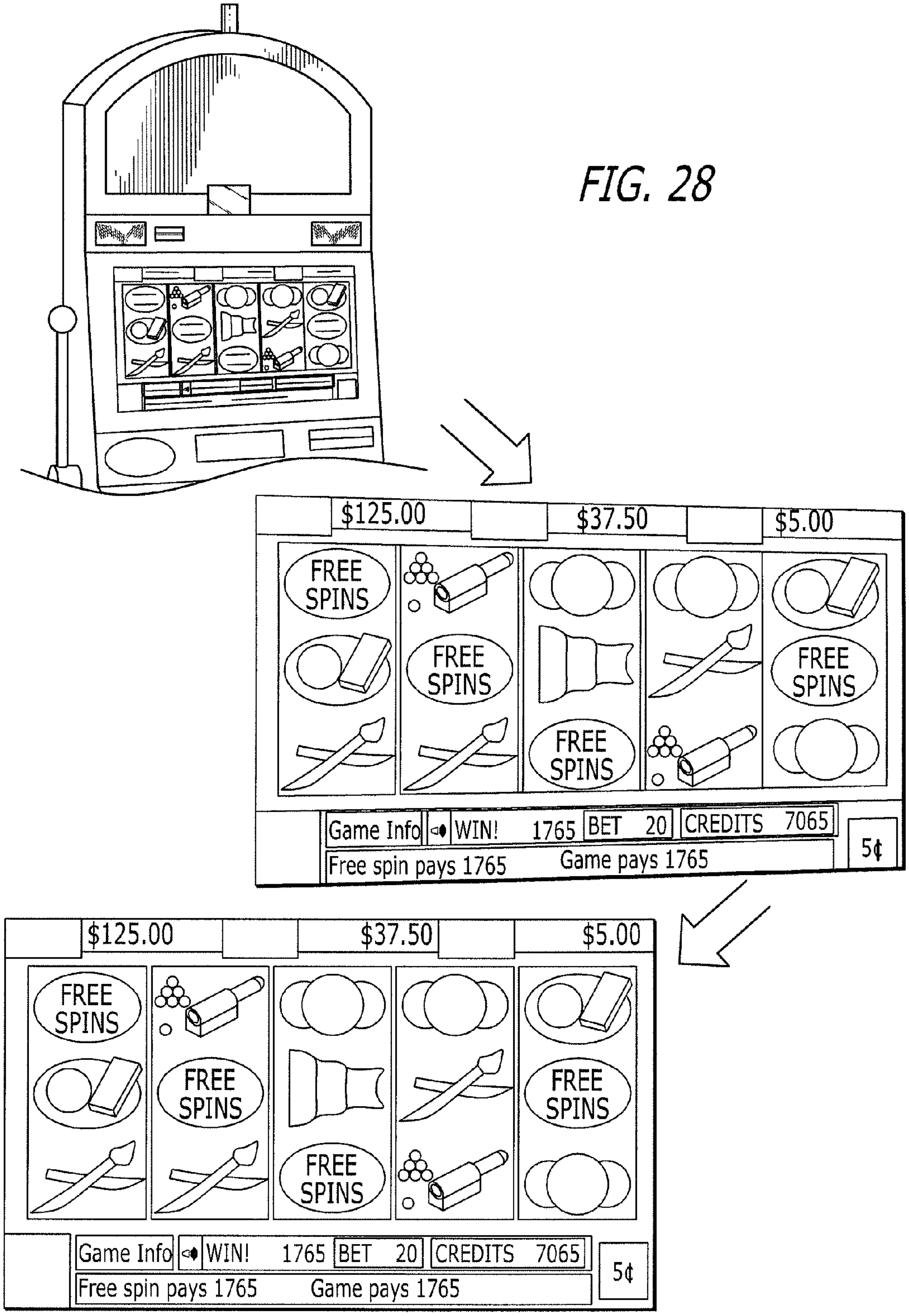
FIG. 28 illustrates a diagram of a process for removal of a perspective distortion of an image.

Referring now to FIG. 28, one embodiment of the gaming system 2200 is shown that illustrates how a gaming machine screen image may be processed from a photo taken by a smart phone camera. Initially, the screen image is extracted. Next, the screen image is transformed by a reverse perspective (or keystone) transformation.

In some embodiments, to assist the keystone transformation of the image, the orientation of the smart phone is determined by reading the smart phone's accelerometer values at the instant the image is captured. Typically, the accelerometer values indicate orientation about the x, y, and z axis. While rotation about the vertical (y) axis is only useful if the orientation of the gaming machine cabinet is known (which may be possible if the location of the camera is known precisely enough), rotation about the x and z axis may be used to reduce the complexity of the transformation required, given that the orientation of the gaming machine screen for a particular cabinet is a known constant about the x and z axis. In this manner, reducing the transform to one axis makes determining the "best fit" relatively straightforward. Once the extent of the gaming machine screen is determined in the image, the angle of rotation of the top or bottom of the gaming machine screen from the horizontal is all that is needed to compute the reverse perspective transformation.

Furthermore, FIG. 28 also illustrates another feature of certain manufacturer-specific games. In this feature, the symbols constituting a win flash are otherwise animated in the event of a win. To compensate for the difficulty this may add to determining the arrangement of symbols, the following steps are taken. Initially, the Image Analysis module has access to every frame of animation of each animated symbol. In this manner, each frame is used to compare against candidate sub-images. Next, the smart phone application takes multiple photos when the player presses the "Take Picture" (or similar) button. These photos are spaced in time such that at least a half a cycle of the known symbol flash time (approximately ten frames or one-third of a second) elapses between consecutive captures. In the event that the symbol matrix cannot be determined from the first image captured, the second and subsequent captures are used to fill in any blanks. In another aspect, multiple image capture is also used as part of the fraud detection strategy described below.

Referring again to FIG. 27, the image captured is analyzed to determine the state of the game with respect to the current denomination being played, current play line configuration, amount bet, and credits available. These values are preferably determined by the use of known OCR (Optical Character Recognition) techniques in conjunction with templates available to the Image Analysis module. The Image Analysis module describes where on the primary gaming machine LCD screen the meter values may be expected to be located. Notably, in another embodiment, manual intervention may be used. In such an embodiment, these values are extracted for the purpose of ensuring that bonus conditions may be met, to help prevent fraud (as described in further detail below), and for passing to the Player Value Tracking system.

In the embodiment shown in FIG. 28, since the game is known to have progressive meters displayed on the screen, these meters are also extracted. Once the symbol matrix and meter values have been determined, they are passed (along with any geographic identification) to the Bonus Match module. If no bonus condition has been met, the player is informed accordingly. In the event that the symbol matrix was not captured correctly, this gives the player another chance to take a photo.

In another aspect of the gaming system having mobile gaming capabilities 2200, if a bonus condition has been met, the image(s) is further analyzed for the purposes of player value tracking and fraud detection. Typically, the first task of the fraud detection method is the analysis of the symbol matrix to ensure that the matrix is valid. One non-limiting embodiment is illustrated by the following result:

| | Reel 1 | Reel 2 | Reel 3 | Reel 4 | Reel 5 |
|---|---|---|---|---|---|
| Line 2 | KING | KING | KING | KING | ACE |
| Line 1 | NINE | SEVEN | QUEEN | KING | JACK |
| Line 3 | ACE | NINE | KING | SEVEN | JACK |

In this non-limiting exemplary embodiment, a player is eligible for a bonus if the player has four Kings in a line. However, the player is only awarded the bonus in this scenario if they have elected to play at least two lines. Furthermore, the following checks are performed to prevent a hacker trying to subvert the process.

In the first hacker prevention step, each of the reel segments is compared against every legal reel strip for this particular game to ensure that they are possible. For example, if there is no known reel strip for reel 4 that contains a sequence of “KING KING SEVEN,” then this configuration may be identified as illegal. Accordingly, a suspicious notification may be generated. In another aspect, games may have different reel strips in different jurisdictions, which in conjunction with the known geographic position of the smart phone may be used to limit the possible legal strips. If the reel segments are found to be valid, the game configuration (in terms of hold) may also be determined to be valid. As such, the game configuration may be passed as data to the Player Value Tracking module for later business intelligence methods, with respect to the evaluation of the success of different holds for games.

In the second hacker prevention step, the winning amount won by the player as represented on the screen and extracted above (along with the associated bet value) is validated against the known pay table to ensure the winning amount has not been faked. Continuing, in the next hacker prevention step, the progressive meters, if present, are compared against the known legal ranges. In the case of wide-area-progressives, where the values of the progressives are known for a given time, the time stamp of the image is used to determine the expected progressive values. If the progressive meter values are not within a small range of these expected values, the bonus may be flagged as suspicious.

Finally, in yet another hacker prevention step relating to a scenario in which multiple image captures are taken, each image is analyzed in turn to ensure that it is consistent with a correct set of animations for the game result. For example, if it is expected that a winning symbol would flash at a certain rate, the bonus can be flagged as suspicious if this flash is not present in the image and/or the sequence is not captured at the correct rate.

If an image passes all of these above-described hacker prevention checks, the system will likely conclude that an image has been taken of a legal bonus. A further set of checks are also performed, however, to guard against “replay attacks.” A replay attack occurs when an unscrupulous person takes multiple photos of the bonus triggering game result, and submits the photos as multiple entries, thereby attempting to earn multiple awards.

In some embodiments, the gaming system 2200 guards against replay attack by comparing the following data obtained from the image against other bonus redemptions for the same game. Such data includes: the arrangement of the symbol matrix, the values of the credit, denomination, bet and win meters, and progressive meters, and the time and geographic location of the bonus being submitted. Regarding the arrangement of the symbol matrix, the odds of two persons hitting the same exact arrangement of paying and non-paying symbols is actually quite high (i.e., in the hundreds of thousands, if not millions to one) for most reasonably high paying game outcomes. With respect to the values of the credit, denomination, bet and win meters, and progressive meters (if present), it is highly unlikely that two bonus winners would have identical values for all of these. Lastly, regarding the time and geographic location of the bonus being submitted, it is highly unlikely that the same winning result would be achieved at the same place and close to the same time. When taken in combination, it is mathematically clear that if two bonus images are submitted that match all of the above, it is likely that fraudulent behavior is the cause of such a result. Once an award attempt passes these hacker prevention checks, the Bonus Award module is signaled to award the bonus, and the smart phone application is signaled to inform the player that the award has been earned.

As described above, various strategies may be performed to prevent “replay attacks” against the gaming system 2200 in which a number of identical submissions are made by one or more players at a similar time. In this type of fraud, when a player wins, in addition to the winning player submitting their photo, one or more other people around the winning player also take photos of the screen in an attempt to try and also get the prize. Normally, only the first submission of a group of identical game results is awarded the prize, with the subsequent submissions being denied.

In another fraud-attempt scenario, a player wins a prize on a gaming machine, but before the winning player has a chance to get their phone out, another person behind the winning player (or at an adjacent gaming machine) takes a photo of the winning game screen and submits the photo. To prevent this type of fraud, in a case where multiple submissions are received by the gaming system 2200, if the first submission is taken at a much further distance, or at a significantly more acute angle (as measured by the perspective distortion of the captured image of the reels) to a second submission then the later submission is determined to be the valid one. This analysis may be performed either automatically, or more preferably, with human interaction.

Referring now to the smart phone application of the gaming system having mobile gaming capabilities 2200, the smart phone application is comprised of a number of smaller modules. In some embodiments, the smart phone application has a user interface that interfaces with the Player Web Interface module. This enables the smart phone application to provide periodic updates with new offers which may be targeted to the player.

In another aspect, the application also includes an image capture module. The image capture module is activated by the player upon them pressing the "Take Picture" button for a particular offer. In some embodiments, the image capture module controls the in-built camera on the smart phone and displays a copy of the current camera captured image on the phone's display, much like a conventional camera application. Additionally, a button is also presented to the player to be pressed when the display of the gaming machine is roughly centered in the camera view. In another embodiment, no button is used, and image analysis algorithms built into the capture module detect the presence of game symbols in the camera view and immediately begin capturing images. The presence of game meters (read by OCR) or a physical barcode sticker may be used to automatically begin capturing images.

In some preferred implementations of the gaming system having mobile gaming capabilities 2200, the image capture module reads the values of the accelerometers from the phone and does not capture images unless the phone is relatively stable (i.e., only small amounts of acceleration detected). This assists the player in making a good image capture in the low (in-door) light of a casino. In some embodiments, the auto-focus algorithms of the phone's camera only allow photos to be taken that are sharp. Additionally, as each image is taken it may be analyzed using box filters and Fourier transforms to detect the overall sharpness of the image. The application may also take multiple image captures until an image is taken that is suitably sharp and contains recognizable data (such as meter values) in acceptable areas of the image.

Figure 28A:
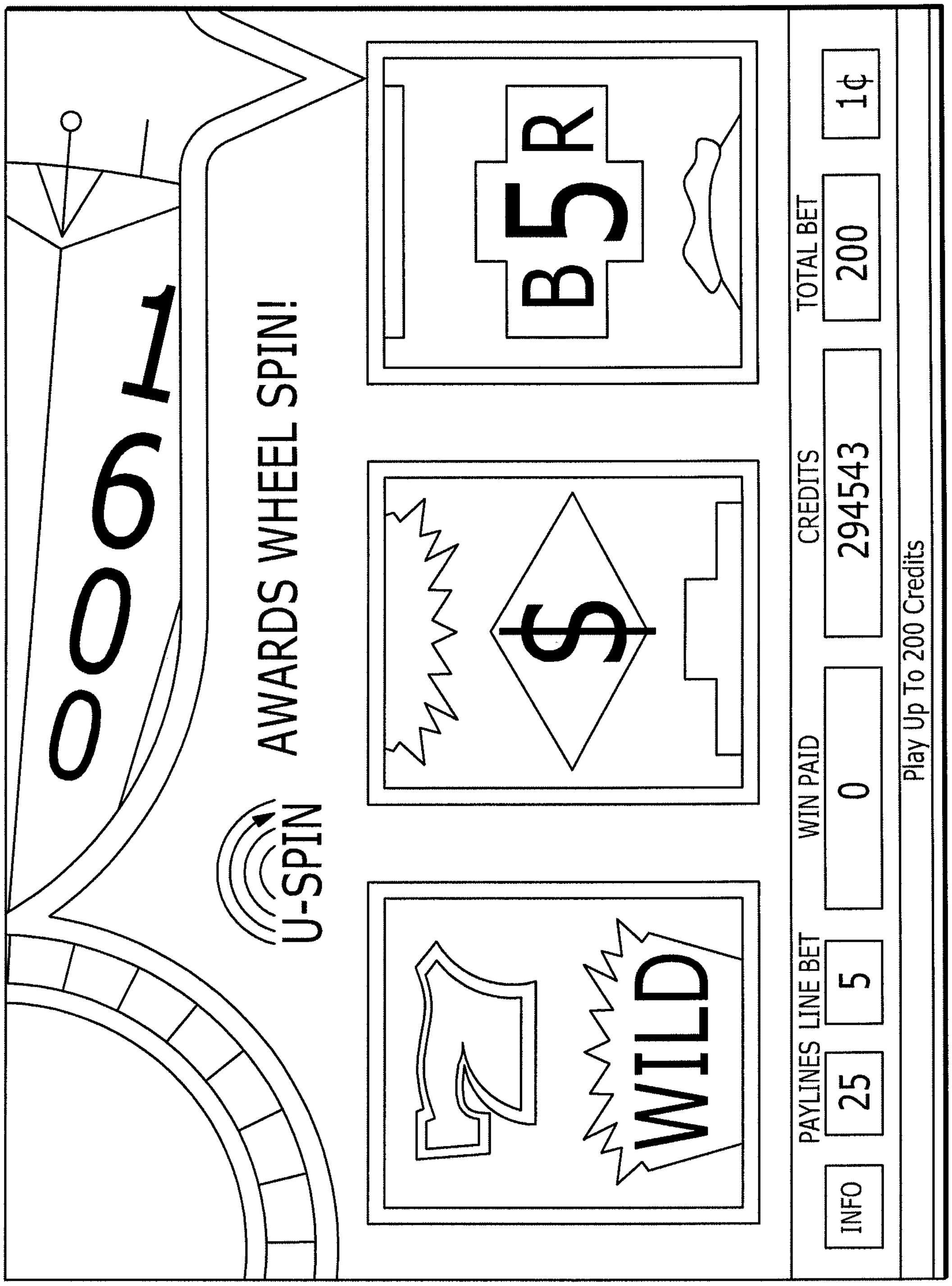
FIG. 28A illustrates a live camera image of a gaming machine screen.
Figure 28B:
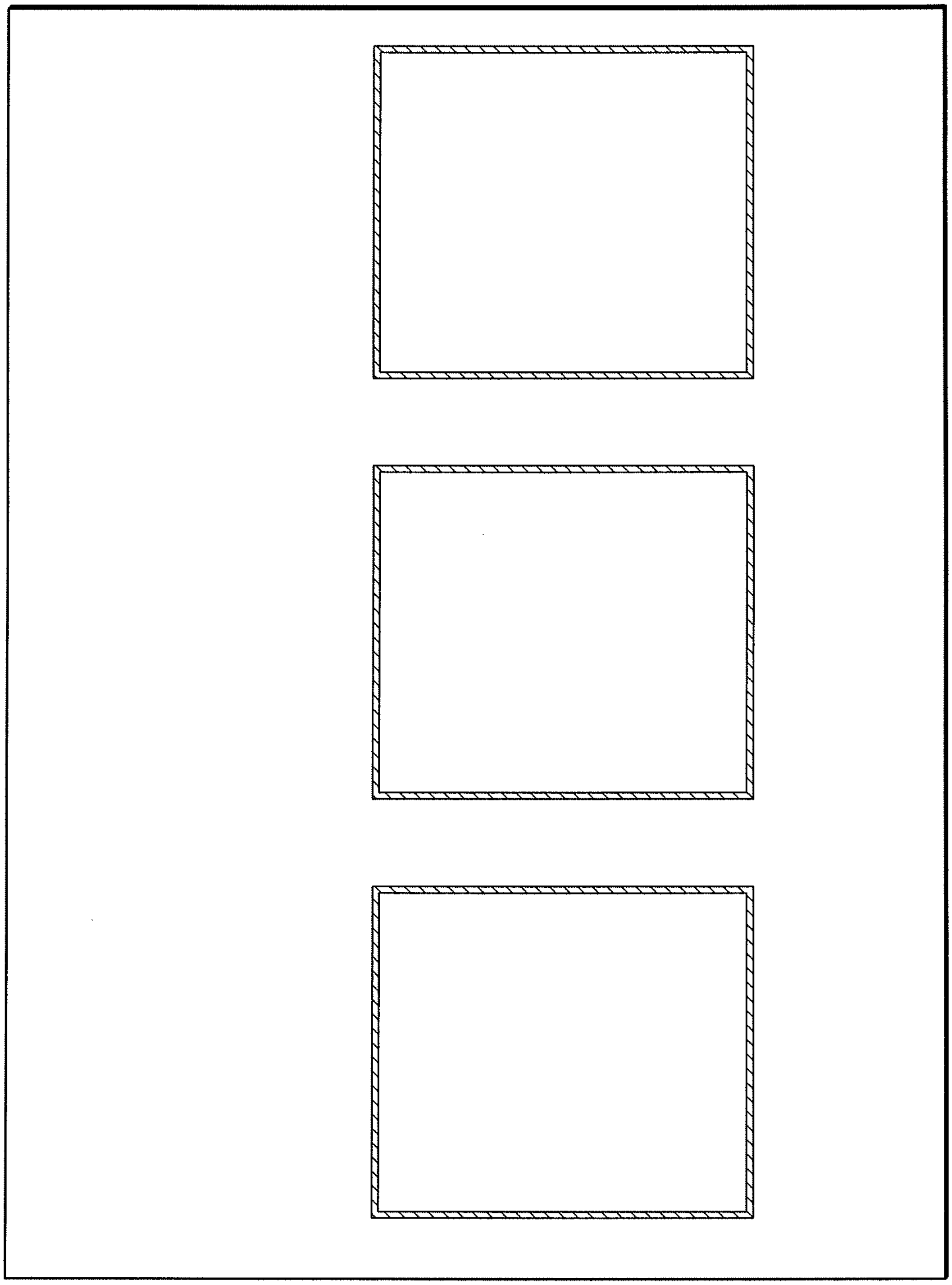
FIG. 28B illustrates alignment boxes that are used by the player to overlay onto the live camera image of FIG. 28A.
Figure 28C:
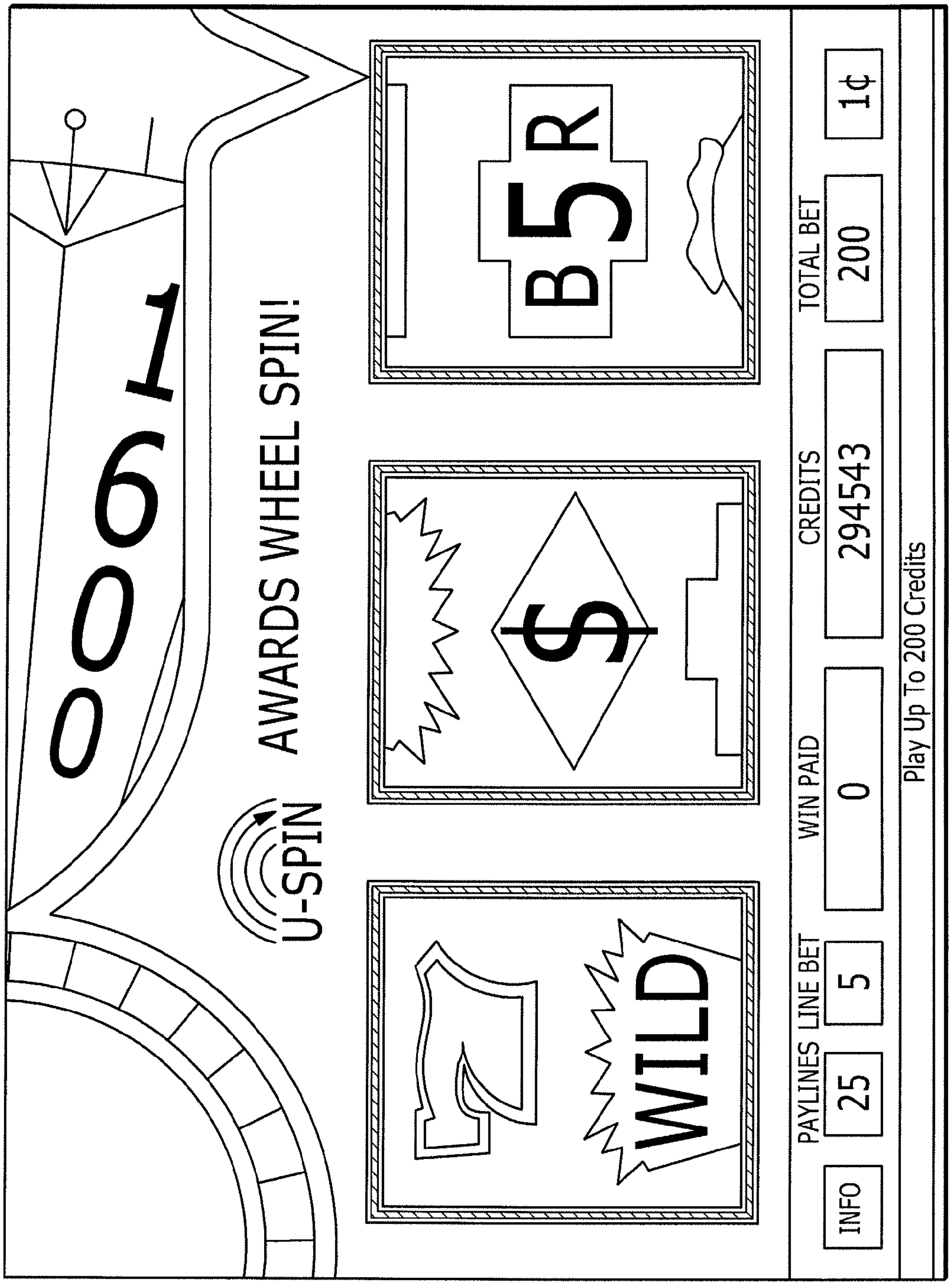
FIG. 28C illustrates the alignment boxes of FIG. 28B overlaid onto the live camera image that was displayed in FIG. 28A.

In one embodiment of the gaming system having mobile gaming capabilities 2200, when a player wishes to submit a result, the player activates the capture function. After activation, the player starts to receive a live feed of the images being received by the phone's camera on the phone's display, which allows the player to see what they are about to capture. For example, as shown in FIG. 28A, a live camera image of a gaming machine screen is displayed. Referring next to FIG. 28B, alignment boxes may be seen that are used by the player to overlay onto the live camera image. FIG. 28C shows the alignment boxes overlaid onto the live camera image that was displayed in FIG. 28A in the manner of a heads up display.

One purpose of the alignment boxes is to make it very easy for a player to know how to align his camera. Another purpose of the alignment boxes is to ensure that other data (such as meter values) will also be captured for hacker detection or player tracking purposes. In this manner, the alignment boxes are sized dependent upon the individual game and are small enough to ensure the data around the reels is also captured. Notably, the "three alignment box" example shown in FIGS. 28A-28C is a single, non-limiting example. In other embodiments, one large box encompassing all three reels may be used. In still another embodiment, a cross hair graphic may be utilized that is aligned with the center of the middle reel.

In another aspect of the gaming system, the Image Encoder module in the smart phone application encodes the image for transmission to the Image Analysis Module. Since the link between the Image Analysis module and the mobile phone is over a public data network such as the internet (in some embodiments), it is important that all communication is encrypted. Furthermore, public key encryption may be used, with server applications only permitting the connection from phones that can prove to be authorized to participate in the bonus system by means of a digital signature. To prevent hacking, it is preferred that the smart phone application platform be relatively secure, with the application only being distributed through authorized channels such as the smart phone manufacturer's Application store or the gaming machines manufacturer's website. In some embodiments of the gaming system, encryption keys and methods are periodically updated to make it more difficult for a hacker to insert their own images into the system. Along with the fraud detection methods disclosed above, these hacker prevention modules are configured to make the risk of significant loss very low.

An alternative for players who do not have access to a smart phone is that casinos or bars may be supplied with phones capable of running the mobile phone application. In the event of a qualifying win, the player calls for assistance and has an attendant or bartender perform the photo verification process.

In some embodiments of the disclosed gaming system, players may use their smart phone to take a photo of the machine and obtain access to the following capabilities: (a) Tournament across venues (e.g., each player signs in, time limited, and the like); (b) take photo of a game (or barcode) to download a mobile application version of the game; (c) obtain a free copy of the mobile game for winning some trivial amount (which ensures players play a game a minimum amount of time); and (d) take a photo of the game to see what gaming machine manufacturer offers are available.

Some preferred implementations of the disclosed embodiments use (1) a smart phone for the client, (2) any suitable web server for communication with the smart phone and registration of players, and (3) OpenCV image analysis software. Additionally, some embodiments provide features that include, by way of example only: (1) alternative player tracking, bonusing, and a marketing method for gaming manufacturers, (2) the capabilities to work with existing games without requiring any modification, and (3) leveraging existing smart mobile phone infrastructure. In other aspects, some embodiments provide: (1) detection of a win by image analysis, without any access to game code; (2) detection of fraudulent entries by analysis of symbols displayed, meters on the screen, location and time of image taken; (3) capture of multiple images to prevent fraud and also more accurately detect wins; (4) alternative method of determining player value (e.g., using win amounts instead of using coin in); (5) enabling the addition of ad-hoc tournaments to existing games; and (6) enabling the targeted marketing of new games for valuable players.

Those skilled in the art will readily recognize various modifications and changes that may be made to the claimed invention without following the example embodiments and applications illustrated and described herein, and without departing from the true spirit and scope of the claimed invention.

What is claimed is:

1. A method of enabling game play of a pseudo skill-based game that includes a game of chance component and an apparent game of skill component, the method comprising:

providing a gaming machine having a primary game presentation, the gaming machine presenting the pseudo skill-based game that awards game credits and game points;

enabling game play on the gaming machine that presents the pseudo skill-based game, wherein the game credits are redeemable for a payout and are controlled by overall payout percentages and a random number generator relating to the game of chance component, and wherein the game points are not redeemable for the payout, game points are not controlled by the overall payout percentages and the random number generator relating to the game of chance component, and a number of game points awarded is increased according to player skill during game play of the pseudo skill-based game on the gaming machine;

awarding a number of game credits per game that is not effected by the player skill, and awarding a number of game points per game that is effected by the player skill; and displaying one or more high scores in the game points for the pseudo skill-based game over a period of time;

wherein a user input device is a secondary touchscreen to the primary game presentation, and the user input device is configured to receive directional, multi-touch gestures to facilitate skill based user input;

wherein the pseudo skill-based game is an outer space themed game in which a player touches the secondary touchscreen to launch virtual missiles from a point of touch to destroy space ships, wherein a length of time of a touch by the player on the secondary touchscreen determines a size or intensity of the virtual missile, wherein long presses result in more powerful and destructive virtual missiles.

2. The method of claim 1, wherein a number of prizes awarded to the player is influenced by the player skill, but a total prize amount awarded to the player is not influenced by the player skill since prize value decreases in correspondence with increases in prize frequency.

3. The method of claim 1, wherein each time a space ship is destroyed the player is awarded monetary game credits, non-monetary game points, or combinations thereof.

4. The method of claim 3, wherein the awarding of the monetary game credits, the non-monetary game points, or combinations thereof gives an appearance that player skill effects a number of monetary game credits awarded, but the number of monetary game credits awarded is controlled by the overall payout percentages and the random number generator.

5. The method of claim 3, wherein an amount of the monetary game credits won is fixed at a beginning of game play by the random number generator, while an amount of the non-monetary game points is derived by the player skill during game play.

6. The method of claim 3, wherein a player with a high score in non-monetary game points is encouraged to enter its initials or name to enable competition against other players.

7. The method of claim 1, wherein a skilled player may receive a larger number of tickets than an unskilled player, presenting the skilled player with tangible evidence of skilled game play.

8. The method of claim 1, further comprising a casino tournament gaming system, wherein the casino tournament gaming system maintains multiple leaderboards including a bank-wide leaderboard.

9. The method of claim 1, further comprising a casino tournament gaming system, wherein the casino tournament gaming system maintains multiple leaderboards including a casino-wide leaderboard.

10. The method of claim 1, wherein the pseudo skill-based game may award privilege-based prizes.

11. The method of claim 1, wherein the pseudo skill-based game may award cash prizes for tournament wins that are not funded by coin-in from gaming machines being played.

12. The method of claim 1, wherein each game continues for a set period of time at the end of which fixed monetary game credits determined at a beginning of play are awarded.

* * * * *

UNITED STATES PATENT AND TRADEMARK OFFICE

CERTIFICATE OF CORRECTION

PATENT NO. : 8,734,232 B2
APPLICATION NO. : 13/252128
DATED : May 27, 2014
INVENTOR(S) : David Bunch et al.

It is certified that error appears in the above-identified patent and that said Letters Patent is hereby corrected as shown below:

In the Specification

Column 24, Line 29, Change “uses” to --using--

Signed and Sealed this
Twenty-third Day of September, 2014

Michelle K. Lee

Michelle K. Lee
*Deputy Director of the United States Patent and Trademark Office*